(12) United States Patent
Hodel et al.

(10) Patent No.: US 11,597,369 B2
(45) Date of Patent: Mar. 7, 2023

(54) ANALYTICAL MODEL TRAINING FOR A MACHINE IMPELLER CONTROL SYSTEM

(71) Applicant: Caterpillar Inc., Deerfield, IL (US)

(72) Inventors: Benjamin J. Hodel, Dunlap, IL (US); Jeffrey K. Berry, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 1060 days.

(21) Appl. No.: 16/274,062

(22) Filed: Feb. 12, 2019

(65) Prior Publication Data
US 2020/0257607 A1     Aug. 13, 2020

(51) Int. Cl.
| | | |
|---|---|---|
| *B60W 10/02* | (2006.01) | |
| *G06N 20/00* | (2019.01) | |
| *G06K 9/62*  | (2022.01) | |
| *E02F 9/20*  | (2006.01) | |
| *E02F 9/22*  | (2006.01) | |

(52) U.S. Cl.
CPC ......... *B60W 10/023* (2013.01); *E02F 9/2079* (2013.01); *G06K 9/6256* (2013.01); *G06N 20/00* (2019.01); *B60W 2710/021* (2013.01); *E02F 9/2253* (2013.01)

(58) Field of Classification Search
CPC .. G06F 11/3447; G06N 20/00; B60W 10/023; G06K 9/6256; E02F 9/2079; E02F 9/2253
USPC ........................................................ 700/29
See application file for complete search history.

(56) References Cited

U.S. PATENT DOCUMENTS

| | | | |
|---|---|---|---|
| 7,853,382 B2 | 12/2010 | Anderson | |
| 8,012,061 B2 | 9/2011 | Lin | |
| 8,666,618 B2 | 3/2014 | Lin et al. | |
| 8,738,251 B2 | 5/2014 | Berry et al. | |
| 8,825,323 B2 | 9/2014 | Lin et al. | |
| 9,551,131 B2 | 1/2017 | Velamakanni et al. | |
| 9,555,706 B1* | 1/2017 | Mitchell | B60W 10/02 |
| 11,384,508 B2* | 7/2022 | Hodel | E02F 9/202 |
| 2008/0082239 A1 | 4/2008 | Anderson | |
| 2010/0114440 A1 | 5/2010 | Lin et al. | |

(Continued)

FOREIGN PATENT DOCUMENTS

| | | | | |
|---|---|---|---|---|
| CA | 2859069 C | * | 2/2020 | ............ B60W 10/06 |
| DE | 102015117563 A1 | * | 4/2016 | .............. B60L 15/20 |

(Continued)

*Primary Examiner* — Atul Trivedi
(74) *Attorney, Agent, or Firm* — Lee & Hayes

(57) ABSTRACT

A method includes obtaining first fluidic pressure information indicative of fluidic pressure in a hydraulic cylinder of a machine as a function of time, and generating a first training set including second fluidic pressure information associated with impeller clutch engagement values. A training system associated with the machine computes a first plurality of test system response values based on the first training set, compares first plurality of test system response values with a plurality of observed response values, and determines a first response error. The training system determines whether the first response error is less than or equal to a threshold error value, generates a time-step predictive analytical model associated with the first training set, and provides the time-step predictive analytical model to an electronic control module of the machine. The time-step predictive analytical model is usable to control machine torque and/or an impeller clutch of the machine.

20 Claims, 9 Drawing Sheets

(56) References Cited

U.S. PATENT DOCUMENTS

| | | | | |
|---|---|---|---|---|
| 2016/0101769 | A1* | 4/2016 | Gibson | F16D 48/06 |
| | | | | 180/65.25 |
| 2016/0312884 | A1* | 10/2016 | Meyer | F16H 59/14 |
| 2018/0118193 | A1* | 5/2018 | Zhao | B60K 6/387 |
| 2018/0162347 | A1* | 6/2018 | Meyer | B60K 6/547 |
| 2018/0178798 | A1* | 6/2018 | Peterson | F16D 25/04 |
| 2018/0179739 | A1* | 6/2018 | Berry | E02F 3/431 |
| 2018/0334160 | A1* | 11/2018 | Kava | B60W 10/06 |
| 2019/0039450 | A1* | 2/2019 | Baba | F16H 63/502 |
| 2020/0040988 | A1* | 2/2020 | Duan | F16D 48/066 |
| 2020/0256036 | A1* | 8/2020 | Hodel | E02F 9/2253 |
| 2020/0257607 | A1* | 8/2020 | Hodel | G06N 20/00 |
| 2021/0175832 | A1* | 6/2021 | Khan | H02P 27/08 |

FOREIGN PATENT DOCUMENTS

| | | | | |
|---|---|---|---|---|
| DE | 112010005946 | B4 * | 8/2016 | F15B 15/26 |
| EP | 3093400 | A1 * | 11/2016 | E02F 3/283 |
| JP | 5630372 | B2 * | 11/2014 | |
| WO | WO-2015046075 | A1 * | 4/2015 | F02D 29/04 |

* cited by examiner

ANALYTICAL MODEL TRAINING FOR A MACHINE IMPELLER CONTROL SYSTEM

TECHNICAL FIELD

The present disclosure relates to automation of a machine impeller clutch, and more particularly, to training an analytical model for a machine impeller clutch controller in earth-moving machinery.

BACKGROUND

Automatic-control of an impeller clutch on an earth-moving machine such as a large wheel loader is a difficult problem to solve because clutch engagement can change dynamically with varying densities and materials in the work pile. A torque converter is used to transfer energy from the engine to the transmission and drive the wheels. The energy transfer is modulated by use of a clutch-driven impeller. A machine operator may depress the clutch pedal to allow for selective driving of the impeller. The impeller clutch can operatively couple the engine and impeller together when engaged (pedal released), and alternatively uncouple the impeller from the engine when not engaged (pedal depressed). By varying impeller engagement by virtue of the degree the pedal is depressed, the operator can modulate how much driving torque is applied to the wheels for a given engine speed, which may also be associated with a wheel speed of the machine.

Achieving the right wheel speed and torque is critical to efficient digging that fills the bucket in a short amount of time without getting it stuck in the pile. Human machine operators use the clutch to minimize fuel and unnecessary digs, and to maximize productivity, whereas human operators may use the clutch inefficiently. Today, the impeller clutch is manually-driven only. Heuristic rule-based controllers exist but are not optimal or adequate because they can address only limited situations encountered by the earth-moving machine. Control algorithms could be devised, but the algorithms would depend on system identifications and un-modelable disturbances that would deviate from reality and not be appropriate for varying material densities.

An attempt to automatically control the tractive effort of a machine based on an input is described in U.S. Patent Application Publication No. U.S. Pat. No. 11,536,892 ("the '892 publication"). Specifically, the '892 publication describes a method and a device for de-rating tractive effort of wheels of a machine to prevent the boom of the machine from stalling in response to receiving a boom control signals. According to the '892 publication, using a standard-form predefined algorithm such as a the proportional-integral-derivative (PID) algorithm, the tractive effort of the vehicle is controlled according to a comparison of boom velocity and commanded velocity. Based on this relation, according to the '892 publication, it is possible to control the machine (e.g., de-rate the rimpull speed of the engine) to eliminate velocity error between boom velocity and commanded velocity.

Although the method and device of the '892 publication are purported to control tractive effort automatically based on a calculated boom velocity, they are not configured to provide automatic control of the machine using time-based predictive analytics that can account for various or changing work pile conditions. Thus, the method and device of the '892 publication may not be useful to provide fully-automated impeller control for the machine because the '892 publication describes a method that can address only limited situations encountered by the machine. Conventional systems, such as those described in the '892 publication, have not provided an automated impeller clutch for earth moving machines because the dig media is often variably dense, with aggregate of different sizes, having different compact densities throughout the work pile, which makes the linear algorithms described in the '892 publication unreliable for all conditions.

The system and method disclosed herein may be directed to mitigating or overcoming one or more of the possible drawbacks set forth above.

SUMMARY

According to a first aspect, an analytical model training method includes obtaining first fluidic pressure information. The first fluidic pressure information indicates a fluidic pressure of a working fluid in a hydraulic cylinder of a machine as a function of time. The method includes generating a first training set that includes second fluidic pressure information associated with impeller clutch engagement values, and computing, using the first training set, a first plurality of test system response values. A training system processor compares the first plurality of test system response values with a plurality of observed system response values, and determines, based at least in part on the comparing, a first system response error associated with the first training set. The processor determines whether the first system response error is less than or equal to a threshold error value, and based at least in part on determining that the first system response error is less than or equal to the threshold error value, generates a time-step predictive analytical model associated with the first training set. The processor may provide the time-step predictive analytical model to an electronic control module of the machine. The time-step predictive analytical model configures the electronic control module to modulate engagement of an impeller clutch of the machine.

According to a further aspect, a method for training a time-step predictive analytical model is described. The method includes obtaining first fluidic pressure information that may be indicative of a fluidic pressure of a working fluid in a hydraulic cylinder as a function of time. A training system processor generates a first training set that includes second fluidic pressure information, where the second fluidic pressure information is associated with impeller clutch engagement values. The system generates a time-step predictive analytical model based on the first training set, and provides the time-step predictive analytical model to an electronic control module of a machine. The electronic control module of the machine controls engagement of an impeller clutch using the time-step predictive analytical model.

According to another aspect, a method for training a time-step predictive analytical model is described. The method includes obtaining first fluidic pressure information, where the first fluidic pressure information is indicative of a fluidic pressure of a working fluid in a hydraulic cylinder of a machine as a function of time. A training system processor generates a first training set that includes second fluidic pressure information associated with observed machine torque response values, and computes a first plurality of test system response values using the first training set. The training system processor determines a first system response error associated with the first training set based at least in part on the first plurality of test system response values and the observed machine torque response values. The training system processor determines whether the first system response error is less than or equal to a threshold error value. Based at least in part on determining that the first system response error is less than or equal to the threshold error value, the training system processor generates a time-step predictive analytical model based on the first training set. The training system processor may provide the time-step predictive analytical model to an electronic control module of the machine. The engine control module modulates the output torque of a transmission of the machine using the time-step predictive analytical model.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
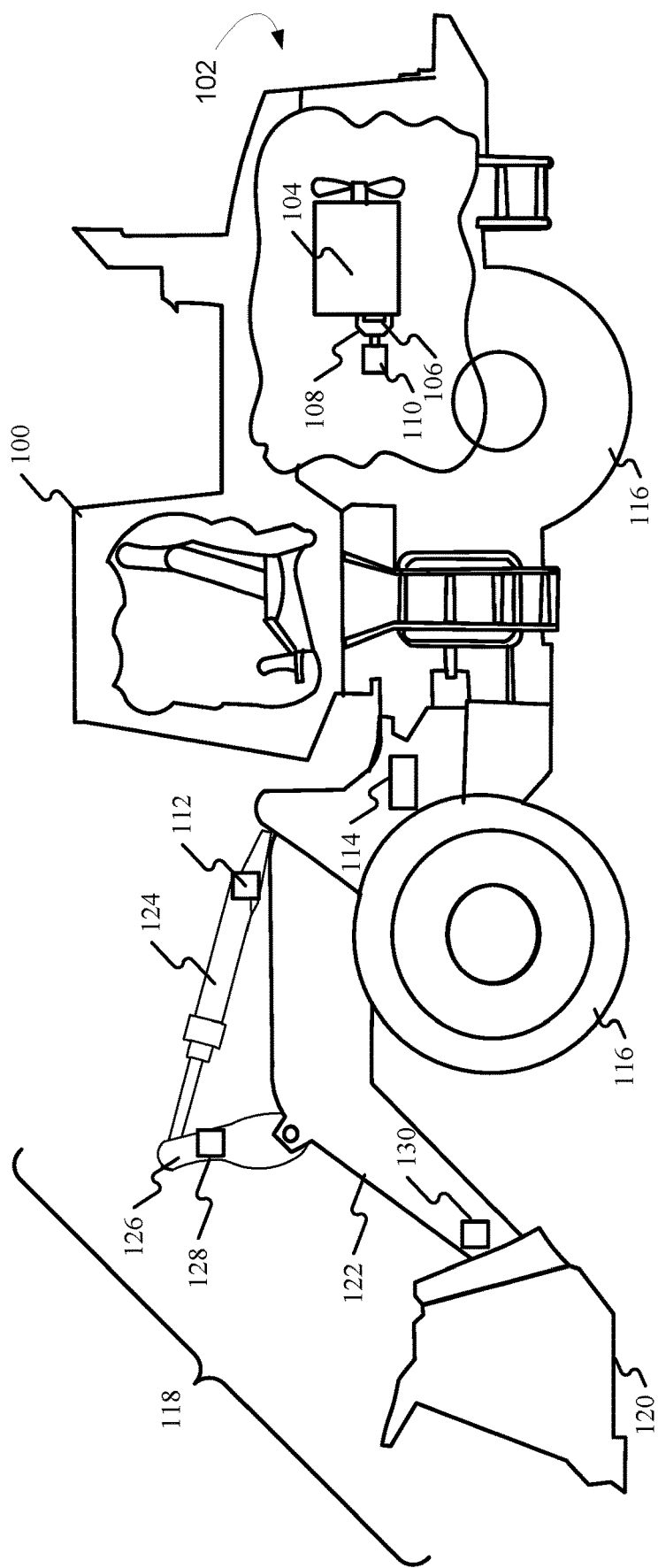
FIG. 1 illustrates an example machine that includes a system for controlling a machine impeller clutch, according to an embodiment.

FIG. 1 illustrates an example machine 100 that includes a system 102 for controlling a machine impeller clutch, according to an embodiment. The machine 100 may embody a mobile machine that performs some type of operation associated with an industry such as mining, construction, farming, transportation, or any other industry known in the art. For example, although depicted as a wheel loader in FIG. 1, the machine 100 may be an earth-moving or material-handling machine such as a wheel loader, a motor grader, or any other suitable moving machine.

The system 102 for controlling the machine impeller clutch (hereafter "system 102") can include a power source 104, an impeller clutch 106, an impeller 108, and/or a transmission unit 110. The system 102 may further include an input device 112 configured to generate a force data signal during a work operation, and an electronic control module 114 in communication with the input device 112 and the impeller clutch 106. The machine 100 further includes one or more traction devices 116, and a work tool 118 for performing work with the machine 100.

The work tool 118, when configured as a wheel loader, can include a bucket 120 coupled to a lift arm 122. The lift arm 122 and bucket 120 may be coupled to and controllably actuated by a hydraulic lift cylinder 124. The hydraulic lift cylinder 124 may be coupled to the lift arm 122 by a lift linkage 126. In some aspects, the system 102 may control the impeller clutch 106 using an input device such as, for example, the input device 112 that may be configured to measure fluidic pressure of the hydraulic lift cylinder 124. In other aspects, the system 102 may control the impeller clutch using, at least in part, position data such as, for example, a work tool angle from an input device 128 configured to measure a lift linkage angle, and/or an input device 130 configured to provide a force data signal indicative of a work tool angle of the work tool 118 (or more specifically, an angle of the lift arm 122 with respect to a normal position), a hydraulic fluid pressure value, or another input.

The power source 104 may produce a power output having both torque and rotational speed components (i.e., Power=Torque×Speed, wherein Speed may be a rotational speed, for example, of a shaft (not shown)), and may embody an internal combustion engine. For example, power source 104 may embody a diesel engine, a gasoline engine, a gaseous fuel-powered engine, or any other engine apparent to one skilled in the art. The power source 104 may contain an engine block having a plurality of cylinders (not shown), reciprocating pistons disposed within the cylinders (not shown), and a crankshaft operatively connected to the pistons (not shown). The internal combustion engine may use a combustion cycle to convert potential energy (usually in chemical form) to a rotational output of the crankshaft of the machine 100 (crankshaft not shown).

The impeller 108 and impeller clutch 106 may be used to transmit torque from the power source 104 to the transmission unit 110. The machine 100 may further include a torque converter assembly (not shown). For example, a torque converter may be a hydro-mechanical device configured to transmit torque from power source 104 to the transmission unit 110. The impeller 108, in conjunction with the impeller clutch 106, may allow the power source 104 to rotate independently of the transmission unit 110. For example, the impeller 108 may be connected to an output of the impeller clutch 106.

The impeller 108 may rotate as a result of operation of the power source 104 (where the impeller 108 rotation is a function of a degree of impeller clutch engagement). Rotation of the impeller 108 may thus impart energy to fluid within a torque converter or other coupling mechanism, such as a power source turbine (not shown) connected to the transmission unit 110. The transmission unit 110 may receive this energy, thus causing the connected transmission unit 110 to rotate. At low fluid flow rates and pressures, the impeller 108 may rotate at a higher speed relative to power source drive components, such as, for example, the power source turbine. However, as the pressure and the flow rate of the fluid conducted between impeller 108 and a torque converter increase, the rotational speed of the torque converter may approach the rotational speed of impeller 108.

Accordingly, the impeller clutch 106 may allow variable engagement between power source 104 and the transmission unit 110. More particularly, the impeller clutch 106 may allow the power source 104 to rotate at a relatively high speed and high torque, while allowing the transmission unit 110 to rotate at a lower speed and/or with a reduced torque. The impeller clutch 106 may contain a plurality of mechanically-interacting input and output disks (not shown) coupling the power source 104 to the transmission unit 110, where the disks may rotate as a result of power source operation. A hydraulic and/or mechanical actuator that axially presses the disks together may selectively engage the impeller clutch 106, thus allowing frictional forces to couple the rotation of the input disk to the rotation of the output disk or vice versa. The magnitude of the pressure applied to the impeller clutch disks may be related to the magnitude of the frictional forces and, subsequently, to the magnitude of the torque transmitted between power source 104 and the transmission unit 110. The impeller clutch 106 may reduce the coupling of the power source 104 to the transmission unit 110 by decreasing the degree of frictional engagement between the clutch disks, thus allowing the disks to rotate more freely relative to each other. Similarly, the impeller clutch 106 may increase the coupling of the power source 104 to the transmission unit 110 by increasing a degree of frictional engagement between the clutch disks (e.g., by increasing the pressure forcing the disks together).

The degree of frictional clutch engagement may be quantified as an impeller clutch engagement value. For example, a clutch engagement value may be a numeric coefficient between zero (signifying full clutch plate engagement that transfers all available torque to the rimpull) and one (signifying no clutch plate engagement that transfers no available torque to the rimpull). As used herein, a clutch engagement value may be analogous to an amount that a clutch pedal (if it were used in the machine 100) would be depressed to achieve the desired amount of torque. In one aspect, no engagement can signify a coupling of all available frictional engagement to transfer all torque between the power source 104 and the transmission unit 110. In another aspect, full engagement, or a clutch engagement value of zero can signify no torque being transmitted between the power source 104 and the transmission unit 110. In further aspects, an impeller clutch engagement value and torque are associated such that a predetermined clutch engagement value can be associated with a predetermined torque value as an output of the transmission unit 110. Because torque values are a function of known factors that include engine size, power output, etc., the relationship between the impeller clutch engagement value and torque, which share an inverse and linear relationship in many embodiments, a lookup table may be used to describe the relationship. In other aspects, an impeller clutch engagement value and wheel speed may be associated in a predetermined way. It is contemplated that the electronic control module 114 may automatically activate the impeller clutch 106. According to an embodiment, the electronic control module 114 is configured to determine an impeller clutch engagement value independent of any signal from a manual impeller clutch control. The impeller clutch 106 may generate a signal indicative of its degree of engagement.

The transmission unit 110 may include numerous components that interact to transmit power from the power source 104 to the traction devices 116. In particular, the transmission unit 110 may embody a multi-speed, bidirectional, mechanical transmission having a neutral position, a plurality of forward gear ratios, one or more reverse gear ratios, and one or more clutches (not shown) for selectively engaging predetermined combinations of gears (not shown) that produce a desired output gear ratio. The transmission unit 110 may be an automatic-type transmission, wherein shifting is based on a power source speed, a maximum operator selected gear ratio, and a shift map stored within a transmission controller. Alternatively, the transmission unit 110 may be a manual transmission, wherein the operator manually engages the actual gear combinations. The output of the transmission unit 110 may be connected to rotatably drive the traction devices 116 via a shaft or other power transmission device (not shown), thereby propelling the machine 100. It is contemplated that the transmission unit 110 may alternatively include only a single gear combination or no gear combinations at all, if desired, such as in a continuously variable or parallel path type of transmission.

The traction devices 116 may include wheels located on each side of machine 100 (only one side shown). Alternately, traction devices 116 may include tracks, belts, or other driven traction devices. The traction devices 116 may be driven by the transmission unit 110 to rotate in accordance with an output rotation of the transmission unit 110.

Figure 2:
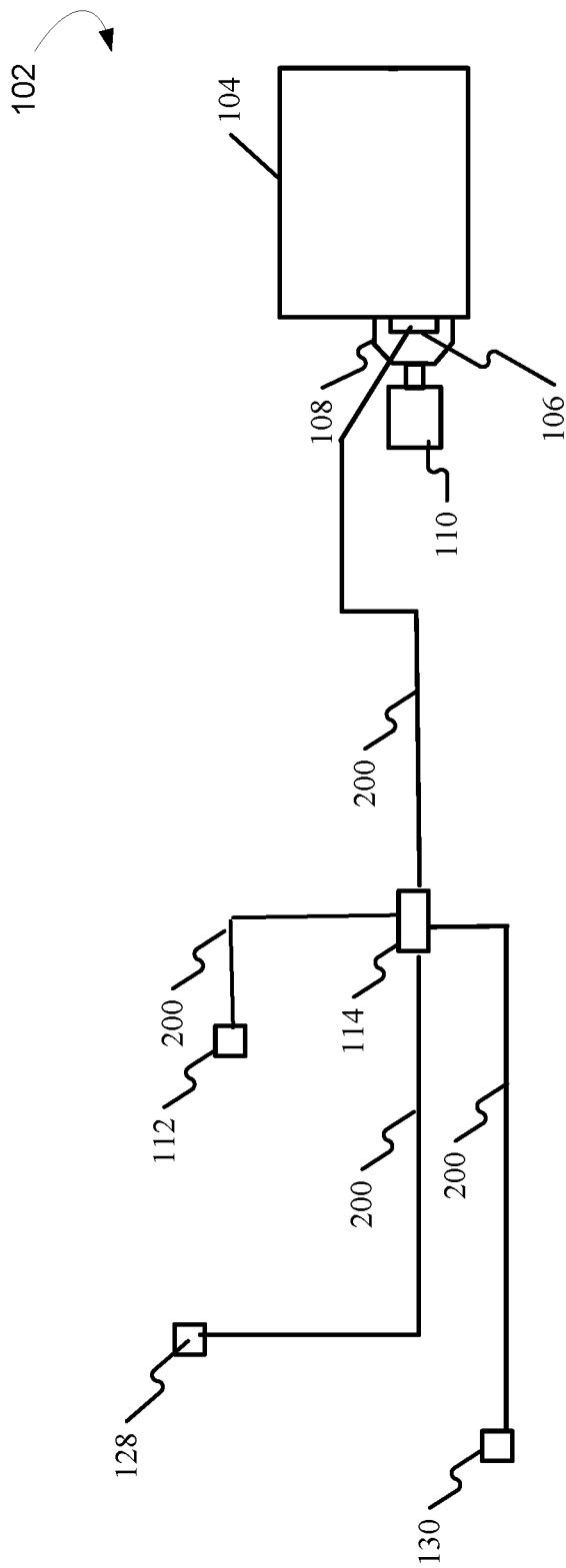
FIG. 2 illustrates an example system for controlling the machine impeller clutch depicted in FIG. 1, according to an embodiment.

FIG. 2 illustrates the system 102 for controlling the impeller clutch of a machine (e.g., the impeller clutch 106 of the machine 100, as shown in FIG. 1). The system 102 may include at least one input device (e.g., input device 112) in communication with the hydraulic lift cylinder 124 (FIG. 1) and/or in communication with a working fluid operable with the hydraulic lift cylinder 124. In other aspects, the system 102 may include a plurality of input devices such as, for example, the input device 128, and the input device 130. The input devices 128 and 130 may be configured to provide positional information, orientation information with respect to a machine element such as, for example, a position or amount of engagement of the hydraulic lift cylinder 124, and/or the like. For example, the input device 128 may include a position sensor configured to provide signal indicative of an angle of the lift arm 122 with respect to a normal position of the machine 100 (e.g., a "home" position, or another arbitrary position from which to measure an operative angle). In another embodiment, the input device 130 may be a position sensor configured to provide a signal indicative of a bucket angle of the bucket 120. In another embodiment, the input devices 128 and/or 130 may provide an input indicative of pressure, velocity, load, and/or other types of information usable by the electronic control module 114 for control and operation of the impeller clutch 106.

The electronic control module 114 (described hereafter in greater detail with respect to FIG. 3) may be disposed in communication with the input device 112 and the impeller clutch 106 through one or more wired or wireless communication channels 200. The electronic control module 114 may be configured with an impeller clutch control engine and a time-step predictive analytical model. The electronic control module 114 may be configured to obtain fluidic pressure information of a working fluid in the hydraulic lift cylinder 124, as a function of time, and determine an impeller clutch engagement value based at least in part on the fluidic pressure information, and/or other data, and further based on the time-step predictive analytical model.

The time-step predictive analytical model may be a machine learning framework trained using a multitude of training dig events. One example of a time-step predictive analytical model is a recurrent neural network (RNN), discussed in greater detail with respect to FIG. 10. A dig event can be, for example, a work session of a machine similar to the machine 100, where one or more human machine operators control the machine to perform a work task such as moving earth, digging, grading soil, or another task normally performed with the machine (and more particularly, performed using an impeller clutch on the machine). The time-step predictive analytical model may be trained by machine-learned training data. The training data can include time series data obtained from available sensors and/or channels (e.g., input devices) on the machine. Examples of input devices that provide training data during dig events can include, for example, an impeller clutch pedal position sensor, sensors that provide series data from lift command valves, tilt command valves, bucket angles, lift linkage angles, lift cylinder velocity, lift cylinder head-end pressures, lift stall statuses, and/or other aspects.

In one embodiment, the input device 112 may be a single device or a plurality of input devices configured to generate a force data signal during a work operation of the machine 100, such as an earth moving operation, material loading operation, or other machine work task. In an embodiment, the force data signal that includes fluidic pressure information indicative of a pressure of working fluid in the hydraulic lift cylinder 124. By evaluating fluidic pressure information as a function of time, using the predictive analytical model, the electronic control module 114 may be configured to automatically operate the impeller clutch 106 during a work operation in nearly all circumstances, earth conditions, soil/work pile densities, etc. Because no two work piles are identical with respect to material density, weight, aggregate content, etc., a recurrent neural network (e.g., the predictive analytical model operating in the electronic control module 114) can adjust and adapt in real time similar to a human operator of the machine by emulating responses observed by human operators that have encountered similar conditions (expressed as input data from the input devices). The aggregated experiences of the human operators used to train the analytical model provide non-linear responses that adjust to changes and sensed patterns. By comparison, the linear control of conventional automatic machine control schemes do not provide efficient impeller clutch control when the work pile is variably dense, has varying materials, weight, etc., because a linear algorithm does not adjust to dynamically-changing environmental conditions. Instead, conventional algorithms for clutch control relying on unchanging algorithmic responses that do not dynamically change based on detected patterns, because the output response of the conventional control algorithm is unchanged given a particular input, without regard of subtle patterns in the input data that may vary with respect to time. A machine learning system that employs analytical methods such as, for example, a neural network, can distinguish subtle patterns in the input data to tailor a system response that emulates the response of a human operator.

Figure 3:
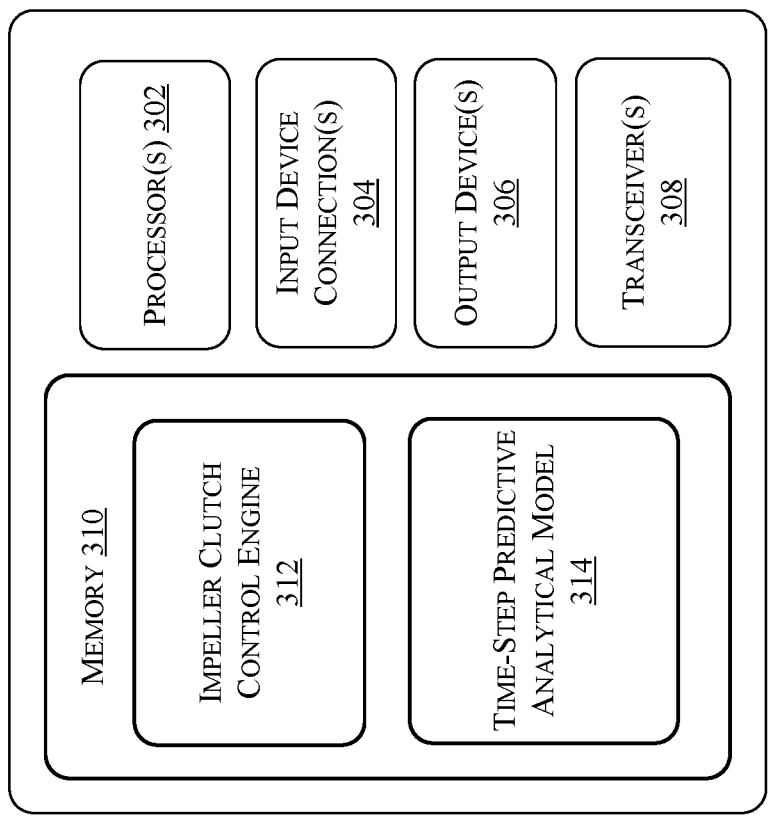
FIG. 3 illustrates a schematic view of an electronic control module configured to control the machine impeller clutch depicted in FIG. 1, according to an embodiment.

FIG. 3 illustrates a schematic view of an electronic control module (which may be similar to or identical to the electronic control module 114, as shown in FIG. 1). The electronic control module 114 may be configured to control an impeller clutch of a machine, such as the impeller clutch 106 of the machine 100, also depicted in FIG. 1. The electronic control module 114 may include one or more processor(s) 302, one or more input device connections(s) 304, one or more output device(s) 306, one or more transceiver(s) 308, and/or a computer-readable memory 310.

The processor(s) 302 may operate to perform a variety of functions, as set forth herein. In some examples, the processor(s) 302 may include a central processing unit (CPU), a graphics processing unit (GPU), both CPU and GPU, or other processing units or components known in the art. Additionally, at least some of the processor(s) 302 may possess local memory, which also may store program modules, program data, and/or one or more operating systems.

The input device connection(s) 304 can include one or more connections with sensors and/or actuators that provide information signals and/or data indicative of flow rates, gaseous pressure, temperature, speed, exhaust gas composition, machine element positional information, fluidic pressure, etc. Examples of input devices that may be in communication with the electronic control module 114 using the input device connection(s) 304 can include the input device 112, 128, and 130, among others.

The output device(s) 306 can include one or more other electronic control modules, control mechanisms, etc., which are not shown herein. The output device(s) 306 may provide information to one or more other systems on the machine 100, or one or more off-board systems in communication with the machine 100.

The transceiver(s) 308 may include wired and/or wireless connections between components included on-board the machine 100, and/or computing devices located off-board the machine 100. For example, the electronic control module 114 may connect via wireless data connection to another system for machine control, communication, or other functionality. For example, the transceiver(s) may connect the electronic control module 114 with a remote server, machine controller, database, etc. Information may be communicated to the one or more processor(s) 302 via one or more network(s) (not shown in FIG. 3), which may include any type of network, such as a public wide-area-network (WAN) (e.g., the Internet), or another wireless network, which may utilize various different technologies including wired and wireless technologies.

The processor(s) 302 may interact with, or include, computer-readable media, which may include volatile memory (e.g., RAM), non-volatile memory (e.g., ROM, flash memory, a miniature hard drive, a memory card, or the like), or some combination thereof. The computer-readable media may include the memory 310, and can be non-transitory computer-readable media. The computer-readable media may be configured to store computer-executable instructions, which when executed by a computer, perform various operations associated with the processor(s) 302 to perform the operations described herein. The output device(s) 306 may also include additional components not listed above that may perform any function associated with the output device(s) 306.

Example embodiments may be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the force data signal as described herein, may be a machine-readable electronic signal.

According to an embodiment, the memory 310 may store one or more control modules including an impeller clutch control engine 312, and a time-step predictive analytical model 314 (referred to hereafter as "analytical model 314"). The memory 310 may further include information indicative of one or more relationships between impeller clutch engagement values and fluidic pressure information. Although described as being contained within the memory 310, it should be appreciated that any one or more of the impeller clutch control engine 312, the analytical model 314 may be stored remote from the electronic control module 114, and accessible by the electronic control module 114 using the one or more transceiver(s) 308.

The impeller clutch control engine 312 may include computer-executable instructions for performing aspects of the present disclosure. For example, the impeller clutch control engine 312 may cause the processor(s) 302 to receive a force data signal from the fluidic pressure measurement device (e.g., the input device 112 may be configured to generate the force data signal by evaluating the signal to isolate fluidic force information such as, for example, information indicative of one or more of fluidic pressure, changes in fluidic pressure with respect to time, fluidic transfer and/or flow information, etc. The processor(s) 302 may, in some aspects, receive the force data signal from the input device 112, and/or another input device. In other aspects, the processor(s) 302 may receive transmission of the force data signal from one or more input devices 112, 128, 130, etc., that may be configured to transmit the data.

The processor(s) 302 may use the force data signal as an input to the analytical model 314 to determine one or more characteristics of interest for automatic control of the impeller clutch 106. For example, the processor(s) 302 may receive the force data signal, process the force data signal using the analytical model 314, and use the output of the analytical model 314 as a clutch engagement setting. The processor(s) 302 may obtain the force data signal, systematically over time, from one or more input devices, and identify patterns in the force data signal(s) that are similar to situations observed in the past (e.g., the training data). The force data signal may include force information indicative of one or more of a velocity of the hydraulic lift cylinder 124, a head-end pressure of the hydraulic lift cylinder 124, a stall status of the hydraulic lift cylinder 124 (indicative of a stall due to an inability of the machine 100 to continue progressing through the work pile at the currently-applied torque), etc. The time series force data signal may provide quantitative inputs with respect to time that mathematically describe environmental, mechanical, and other factors associated with a dynamically changing work scenario. For example, the processor(s) 302 may obtain time-series data (e.g., fluidic force information indicative of head-end pressure of the hydraulic lift cylinder 124) with respect to time, and evaluate subtle changes in the head-end pressure of the hydraulic lift cylinder 124. The processor(s) 302, using the analytical model 314, may match the input data to the one or more response in the training data, where the one or more responses were learned through observing multiple examples of a similar situation. The processor(s) 302 may identify a pattern in the force data signal (e.g., a series of pressure changes in the hydraulic lift cylinder 124, either alone or in conjunction with another type of input). The processor(s) 302 may infer an appropriate response to the current input data based on the past data observed by the system (e.g., the computer 1102 described hereafter with respect to FIG. 11) due to the network weights and biases that have been learned during training via one or more matching algorithms, and subsequently emit an impeller clutch engagement value based on the inferred response. The impeller clutch control engine 312 may instruct the processor(s) 302 to engage the impeller clutch 106 of the machine 100 according to the impeller clutch engagement value.

Figure 11:
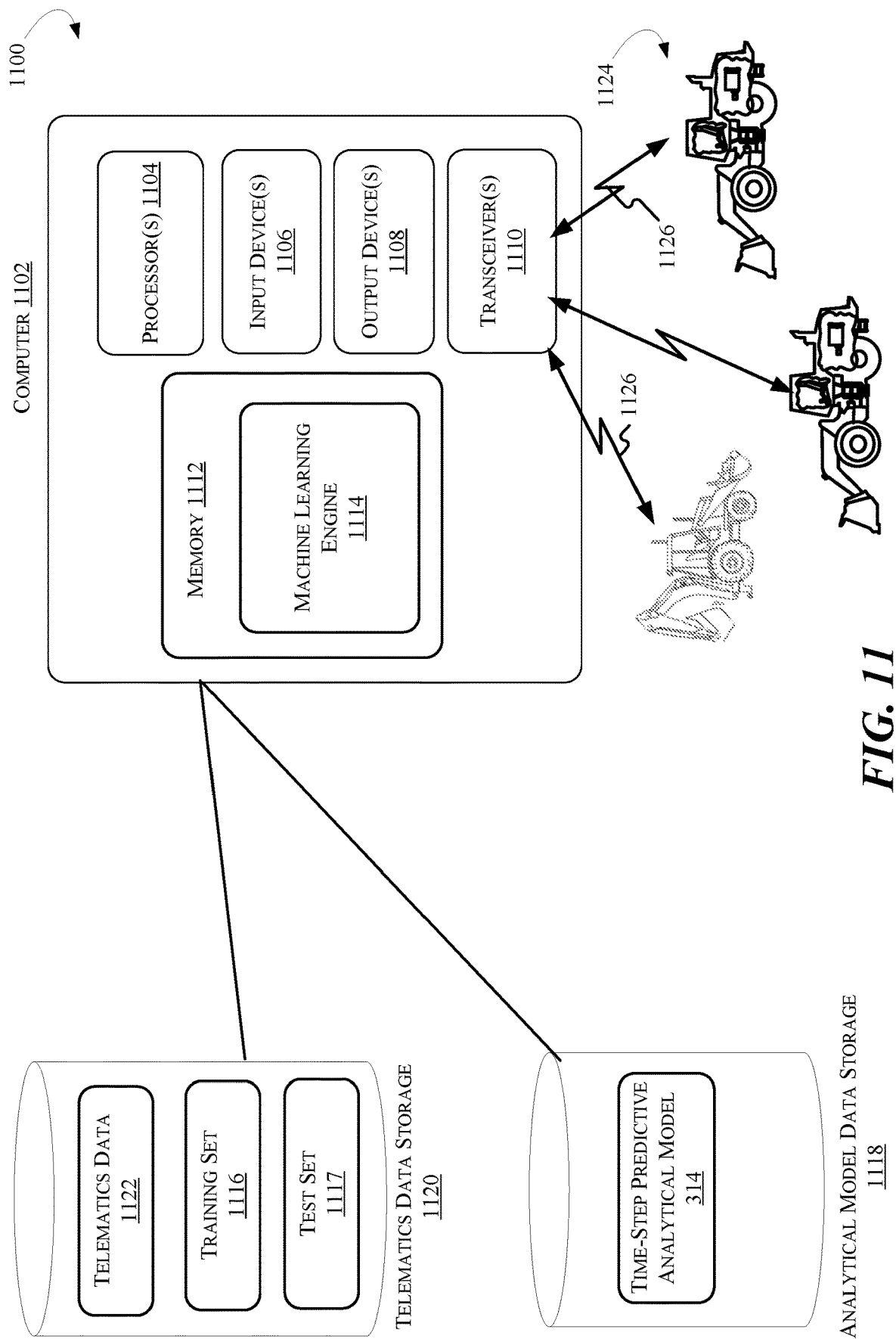
FIG. 11 depicts a machine learning system, according to an embodiment.

The analytical model 314, as referred to herein, is a control framework that can be trained (e.g., generated) by a machine learning system, such as a machine learning system 1100, described hereafter with respect to FIG. 11. More particularly, the analytical model may be a neural network or other framework that can be trained using telematics data as an input. As used herein, telematics data can include machine-generated data obtained from one or more systems of work vehicles while they are being operated in various work operations. According to embodiments described herein, a feature vector is one aspect of machine control information that may be used to describe a series of values, with respect to time, where the values are associated with a characteristic of interest. For example, one feature vector may be fluid pressure in a hydraulic cylinder. Another feature vector may be a change in fluidic pressure between an array of fluidic pressure sensors disposed in a hydraulic cylinder, with respect to time. Another example of a feature vector may be an angle, a position, a status (e.g., on, off, etc.), or other characteristics that can describe an aspect of machine operation. The feature vectors obtained from telematics data obtained by recording system response during a work operation performed by a human machine operator. The telematics data may be the input data for a machine learning training system (such as, for example, the machine learning system 1100 described with respect to FIG. 11) that can generate an analytical model that mimics the response values of a human machine operator (e.g., a human machine operator with operational knowledge of impeller clutch control), such as the analytical model 314.

A system for training the analytical model 314 (described in greater detail hereafter) may be configured to receive a plurality of telematics data as an input, where any one of the telematics data includes information that describes force data and other information generated by machine control modules of individual machines during work operation(s) of the machine. The training system can collect feature information of interest (e.g., as a function of time) while the machine is operated by an operator. An analytical model (and more specifically, the analytical model 314) may be a trained neural network or other analytical framework that incorporates tens, hundreds, and at times, thousands of examples of a feature vector values as inputs. The feature vector information can describe time-stepped values of one or more characteristics of interest, as a machine operator (e.g., an experienced machine operator) performs the work tasks using a similar machine, in varying conditions. Once trained, the analytical model 314 may perform a work operation using the analytical model 314 without operator input (respective to the trained feature of interest), and output a response for the trained feature vector that is similar to or identical to a response of that feature vector if the machine work operation were performed by a human operator performing the work.

For example, the machine learning system 1100 (as described hereafter with respect to FIG. 11) may collect information from tens, hundreds, or thousands of training digs. The machine(s) performing the training dig(s) may be configured to generate telematics data indicative of time-step values of one or more onboard channels that describe a response of a characteristic of interest, with respect to time. Each training dig telematics data of the plurality of training dig telematics data may describe feature vector information associated with a characteristic of interest during a work operation performed by a human machine operator. A characteristic of interest may be, for example, a degree of impeller clutch engagement expressed as a value between zero and one with respect to time. Accordingly, using many examples of feature vector response under various work conditions, soil densities, operator styles, etc., a neural network (the analytical model 314) can be configured to receive, as input, time-step values of a trained characteristic of interest (e.g., the fluidic pressure information associated with a hydraulic lift cylinder) during a work operation. The impeller clutch control engine 312 can instruct the processor(s) 302 to execute the analytical model 314, and evaluate the input data using the trained analytical model 314, and output a control signal using the feature vector response that mimics or duplicates (within a predetermined margin of error) the output response of a human machine operator encountering similar conditions. As with all machine learning training systems, the predetermined margin of error decreases with respect to the volume of training data used to train the system. Accordingly, if the training data is few in number, the system response may have an error that exceeds tolerable limits when compared to the system response of a human operator performing the same work under the same conditions.

The training system may relate fluidic pressure and other inputs to the impeller clutch engagement. The training set can include a table having columns of information organized as features, and rows of information organized as instances or observations of respective features. Once trained, the model can predict the label given features, even when the label information is not present. Therefore, the label describes a relationship between features that are input to the system. More specifically, many telematics data may be used to train the analytical model 314, and as a practical matter, can often exceed hundreds of telematics data that describe feature data from a variety of work conditions.

The time-step regression values used by the analytical model 314 may be optimized during the training process by the machine learning system 1100. When trained using a sufficiently large number of telematics data, the analytical model 314 may process the inputs through trained parameters (weights and biases) to produce (or infer) the desired response. For example, if the input feature vector is x and the model was a multi-layer perceptron with two-layers with weights and biases w1, b1, w2, b2 respectively, then the output of the model can be y=tanh(tanh(x # w1+b1) # w2+b1), where # is a matrix multiplication. A recurrent neural network may be similar, but may contain a cell state that persists between predictions and input/forget gates that add and subtract content to the cell state. The cell state may be finally processed through an output gate to yield the prediction/inference value. Accordingly, the processor(s) 302 can cause the analytical model 314 to receive a force data signal from one or more input devices via the input device connections(s) 304, access the analytical model 314 to obtain an optimized set of time-step output values, and generate a control signal to operate one or more machine components in a similar manner as a human operator given the same work conditions. The analytical model 314 can also provide predictive analytics given a limited number of input values, where the analytical model 314 can fill in missing data and predict an output value given a particular input or combination of inputs, within a predetermined margin of error.

Figure 4:
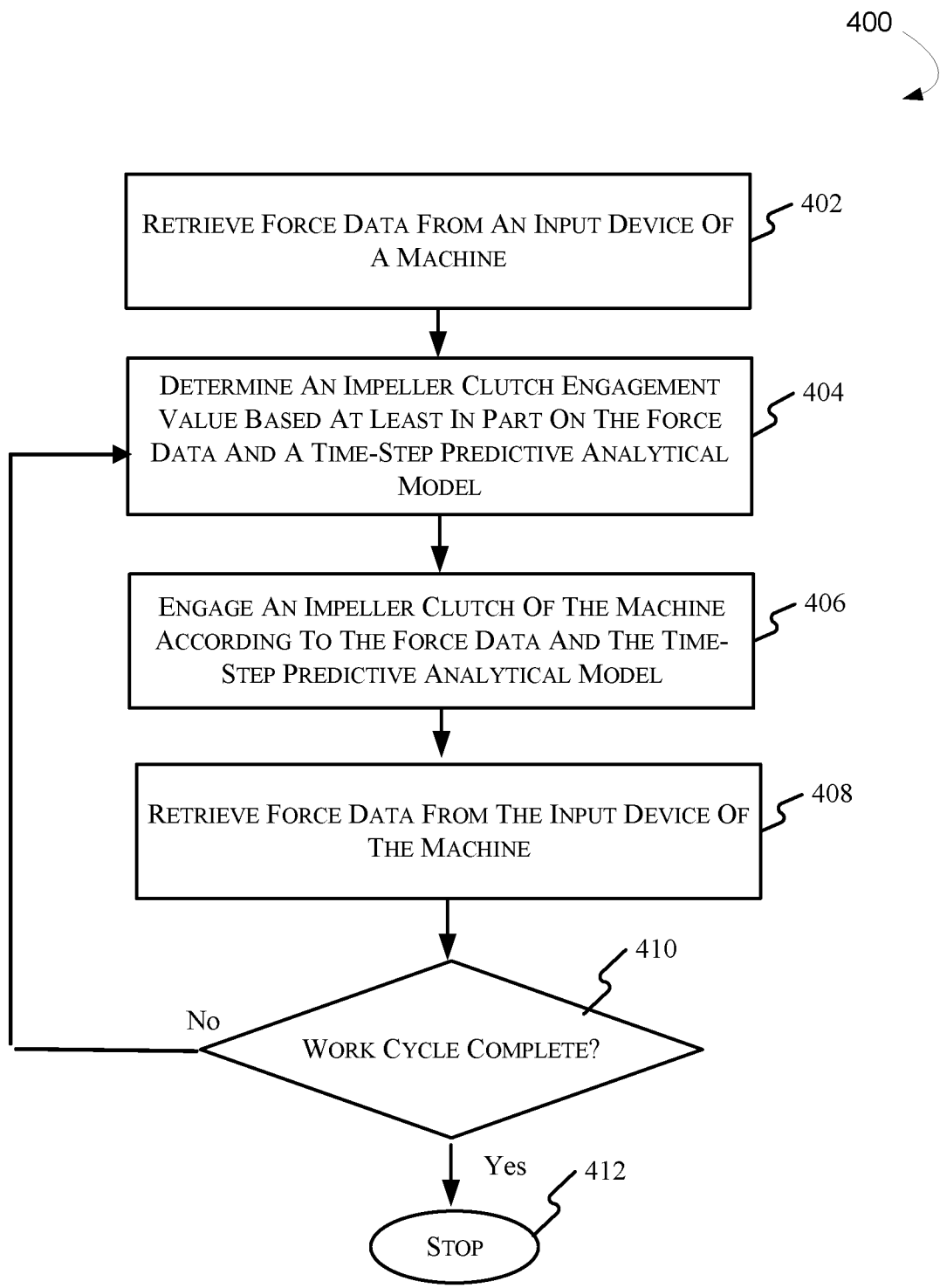
FIG. 4 illustrates a pictorial flow diagram of an example process for controlling a machine impeller clutch using a time-step predictive analytical model, according to an example embodiment.

FIG. 4 illustrates a pictorial flow diagram of an example method 400 for controlling an impeller clutch 106 of a machine 100 using the analytical model 314, according to an example embodiment. The method 400 may be performed with a machine such as, for example the machine 100 as shown in FIG. 1. The machine described in the method 400 includes an electronic control module such as the electronic control module 114 described with respect to FIG. 3. In particular, it should be appreciated that the machine 100, or any machine practicing the method 400 described herein, may or may not include an impeller clutch pedal or other impeller clutch operation control for manual control of the impeller clutch 106 by an operator of the machine 100. Regardless of whether the machine of method 400 includes a manual clutch control mechanism, the method 400 describes operations that may replace a manually-controlled impeller clutch with an automated control using the analytical model 314.

At step 402, the processor(s) 302 obtains the force data signal having fluidic pressure information of a working fluid in the machine 100. The force data signal may indicate a fluidic pressure measurement taken at a single location (e.g., at the input port of a hydraulic cylinder such as the hydraulic lift cylinder 124, as depicted in FIG. 1), or a fluidic pressure measurement taken at a plurality of locations (e.g., at an input port of the hydraulic lift cylinder 124 and at the output port of the hydraulic lift cylinder 124). The force data signal, in other aspects, may be indicative of a velocity of one or more machine 100 components such as the work tool 118, the bucket 120, the lift arm 122, or another location. In another aspect, the force data signal may be indicative of a velocity of some aspect of the machine 100 (e.g., a velocity of movement of the hydraulic lift cylinder 124).

In one aspect, the force data signal may be indicative of a working fluid pressure. A working fluid may be, for example, hydraulic fluid, oil, or another working fluid in the machine 100. The fluidic pressure value of the working fluid at discrete points in time (e.g., at each predetermined increment of time). For example, the force data signal may include information indicative of a fluidic pressure measurement in kPA. The force data signal may also include information indicative of simultaneous measurements of fluidic pressure at two or more locations, which can indicate a flow rate of the working fluid with respect to time, a velocity of the working fluid at a point in time, or another aspect of machine operation.

In other aspects, the force data signal can include information including, for example, an angle, a distance measurement, or an operative status of a machine component. A status of an operation may be, for example, a stalled status of the hydraulic lift cylinder 124 that may indicate whether the hydraulic lift cylinder 124 is stalled (due to encountering material in the work pile with the work tool 118 that is impenetrable given a particular applied torque or rimpull), or not stalled (indicative that the current applied torque or rimpull is sufficient or more than sufficient to perform an operation). The force data signal may further include information indicative of a level of actuation of one or more components of the machine 100. For example, the force data may include information indicative of a level of valve opening of a lift command valve of the hydraulic lift cylinder 124, where the level of valve opening can be a value between 0 (not open) and 1 (fully open). Other examples of force data are contemplated.

According to embodiments, the processor(s) 302 may obtain the force data as a function of time. For example, the force data can be received by the processor(s) 302 at a predetermined increment of time. In an embodiment, the predetermined increment of time may be every 500 milliseconds (ms), every one second, every two seconds, every five seconds, etc. The predetermined increment of time may be indicated by the analytical model 314.

At step 404, the processor(s) 302 may determine the impeller clutch engagement value based on a fluidic pressure value obtained as part of the force data. For example, the processor(s) 302 may access the analytical model 314, which may store a set of impeller clutch engagement values associated with a set of fluidic pressure measurements. The processor(s) 302 may select an impeller clutch engagement value by comparing the force data received at step 402 to the set of impeller clutch engagement values using the analytical model 314.

According to an embodiment, comparing may include, for example, determining, with the processor(s) 302, whether a difference between the force data and a "best fit" value in the analytical model 314 falls within a predetermined threshold of error, and selecting the impeller clutch engagement value associated with the best fit value when the error falls within the predetermined threshold. Other methods of comparing are contemplated, and thus, should not be considered limiting as described herein. Regardless of the method of comparison, the processor(s) 302 may determine the impeller clutch engagement value based on an impeller clutch engagement value associated with the force data.

A calculated impeller clutch engagement value may be indicative of a fluidic pressure value and a quantitative fit between the fluidic pressure value and a correlated feature vector. For example, the force data may be indicative of one or more feature vectors that can include one or more of a lift cylinder velocity, a lift cylinder head-end pressure, a lift cylinder stalled status, a lift linkage angle, a work tool angle, and a tilt command valve position. Other features are contemplated. Accordingly, the determined impeller clutch engagement value may be one of a series of time-stepped impeller clutch engagement values associated with the force data, and best fit into the analytical model 314 using a fluidic pressure value.

By determining the impeller clutch engagement value based on a reading of fluidic pressure or another observed feature, the processor(s) 302 may determine a series of appropriate impeller clutch engagement values, as a function of time, between the current observed force data reading and the next scheduled force data reading. In this respect, the analytical model 314 is predictive, because one or more optimized impeller clutch engagement values for a future impeller clutch control setting (e.g., the time between an initial point in time, and during the moments intervening that point in time and the next cycle of force data input, which can be one second later, 5 seconds later, etc.). Accordingly, impeller clutch control settings can be predicted by the processor(s) 302, for a future clutch control operation, based on a current observation of one or more characteristics of a work operation.

The processor(s) 302 may determine an impeller clutch engagement value based at least in part on the force data and the analytical model 314. The impeller clutch engagement value may indicate a value for engagement of the impeller clutch 106. For example, as explained above, a clutch engagement value (or more strictly termed, clutch disengagement value) may be a numeric coefficient between zero (signifying full clutch plate engagement that transfers all available torque to the rimpull) and one (signifying no clutch plate engagement that transfers no available torque to the rimpull). Accordingly, the clutch engagement value may be analogous to an amount that a clutch pedal (if it were used in the machine 100) would be depressed to achieve the desired amount of torque. In one aspect, full engagement can signify a coupling of all available frictional engagement to transfer all torque between the power source 104 and the transmission unit 110. In another aspect, no engagement, or a clutch engagement value of one can signify no torque being transmitted between the power source 104 and the transmission unit 110. In further aspects, an impeller clutch engagement value and torque are associated such that a predetermined clutch engagement value can be associated with a predetermined torque value as an output of the transmission unit 110.

At step 406, the processor(s) 302 may engage the impeller clutch 106 of the machine 100 according to the force data and the time-step predictive analytical model 314. The processor(s) 302 may be configured to determine the impeller clutch engagement value independent of any signal from a manual impeller clutch control. Stated another way, the machine 100 may not include a manual impeller clutch control mechanism such as a pedal or other operator control.

In another aspect, the machine 100 may include an impeller clutch control mechanism, but the processor(s) 302 is configured to determine an impeller clutch engagement value independent of any signal from a manual impeller clutch control.

At step 408, the processor(s) 302 may retrieve the force data from the input device 112 of the machine 100. In one aspect, retrieving the force data can include retrieving a series of values indicative of fluidic pressure values with respect to time.

At step 410, the processor(s) 302 determines whether the work cycle is complete. If the machine is continuously working, which may be indicated by a fluidic pressure change (or lack of fluidic pressure change), a machine status, an engine status of the power source 104, or another indicator, the time increment advances to the next predetermined time to determine the next impeller clutch engagement. A work cycle may be complete when the work operation is ceased, the machine 100 is in an idle state, or the machine 100 is otherwise disengaged or shut off.

One goal of efficient control for an impeller clutch is to fill the bucket or other work tool as full as possible with material from a work pile, using a minimal amount of fuel and time. For example, a human operator using a manual impeller clutch control may tend to under-engage the machine impeller clutch and expend more fuel than necessary (by providing more torque and/or rimpull than is needed to penetrate the pile and fill the bucket). In another example, a human operator, using a manual impeller clutch control, may expend more time and fuel than is necessary (by over-engaging the impeller clutch, and stalling the bucket in the work pile, which requires additional fuel to back out of the work pile and approach another time). A typical work pile to be moved by a machine can include consistent compactness, or more realistically, may contain a varying-density mixture of material to be moved. Conventional algorithms are not suited for efficient impeller clutch control due to the varying density of materials, and also due to the varying forces on the work tool as the bucket penetrates the pile, fills with the bucket or other work tool with material, and is lifted free of the surrounding pile. Stated another way, conventional systems have not provided an automated impeller clutch control system because the dig media is often varied in density, with aggregate of different sizes, materials, etc., which necessitates a non-linear control mechanism. The system 102, as described herein, may provide non-linear control of the impeller clutch 106 that predictively engages the impeller clutch 106 with impeller clutch engagement values that are based, at least in part, on feedback data (e.g., the force data) that may vary throughout the work operation.

As explained in detail hereafter, the optimal impeller clutch engagement values may describe optimal impeller clutch engagement (e.g., make predictions on future settings) based on limited feedback in the form of fluidic pressure measurements and/or other information. Accordingly, embodiments described herein provide predictive analysis for force data, which can provide impeller clutch engagement for predicted work conditions that emulate impeller clutch engagement control by a human operator of the machine 100.

FIGS. 5, 6, 7, 8, and 9 depict the machine 100 during an example work operation on a work pile 500, as the machine 100 executes the method 400 described herein. More particularly, at each figure of FIGS. 5-9, the machine 100 may execute an iteration of the method 400 to determine and implement an optimal impeller clutch engagement value. For example, as the machine 100 encounters forces that vary throughout the work pile 500, new force data is obtained by the electronic control module 114 at each step that indicates a different clutch engagement value of the impeller clutch 106 to provide automated impeller clutch control similar to the impeller clutch control of a human machine operator using a manual impeller clutch pedal.

As described with respect to FIGS. 5-9, clutch engagement may be analogous to depression of an impeller clutch pedal. Accordingly, as used herein, a full clutch engagement refers to the equivalent action of a full depression of a clutch pedal, if it were it being used on the machine 100. No clutch engagement refers to the equivalent of no depression of the clutch pedal (e.g., complete engagement of the impeller clutch 106 to the impeller 108), such that the impeller clutch would transfer all torque from the power source 104 to the impeller 108 and the transmission unit 110.

The work pile 500 may be any material, such as, for example, aggregate materials mixed with earth (e.g., cement, stone, soil, etc.). Although described as earth arranged in a work pile on a flat surface of the ground, it should be appreciated that the work pile 500 can be any material moved by a machine, which can include any number of materials, in any arrangement or configuration. Stated another way, the term work pile should be construed more generally as media to be manipulated by the machine, where the media may be configured in any arrangement. Moreover, as explained previously herein, although depicted as a wheel loader, the machine 100 may be any type of machine, performing other types of work tool operations than those described herein, and depicted in FIGS. 5-9.

According to an embodiment, a feedback element from which impeller clutch engagement may be based can include a fluidic pressure measurement. Depictions of example fluidic pressure measurements 502, 504, 506, 508, and 510 are respectively provided in FIGS. 5-9. The fluidic pressure measurements 502-510 are shown for demonstrative purposes only, to provide one possible example of relative measurement of fluidic pressure given an input for the analytical model 314. Accordingly, the fluidic pressure measurement 502-510 may be operative in a feedback loop to dynamically and predictively control the impeller clutch engagement of the machine 100.

Impeller clutch engagement values 512, 514, 516, 518, and 520 are respectively depicted in FIGS. 5-9. As described herein, the analytical model 314 may access the analytical model 314 to determine impeller clutch engagement values at respective time-steps, using the respective fluidic pressure measurement 502-510. Torque applied via the power source 104, as respectively depicted in FIGS. 5-9 as torque 522, 524, 526, 528, and 530, may be associated in the analytical model 314 with a respective level of clutch engagement 512-520.

The analytical model 314 may be a time-step predictive analytical model. Accordingly, a time-step indication is depicted at each of FIGS. 5-9. It should be appreciated that there may be any number of time steps, although time steps are shown delineated as steps 0-N. It should also be appreciated that there may be optimal impeller clutch engagement values that can vary between discrete time-steps. Accordingly, a fluidic pressure measurement 502-510, alone or in conjunction with another machine-made observation of the work operation (not shown), may provide inputs for predictive analysis of an optimal impeller clutch engagement at sub-steps between each of the discrete time-steps 532-540 shown. For example, looking at FIG. 5, at time-step 0, a depicted amount of impeller clutch engagement 512 is shown to be roughly 0.80 on a scale from 0 to 1. However, not shown may be a series of discrete impeller clutch engagement values that intervene time-step 0 and time-step 1. For example, if the predetermined time increment in a time-step is a 5 second interval, there may be three intervening sub-steps associated with a total of 5 (or some other number) impeller clutch engagement values, to be implemented at each passing second. Accordingly, the analytical model 314 may generate a series of fluidic pressure values associated with respective impeller clutch engagement 512, to be executed by the processor(s) 302, in order, at regular sub-intervals of time. Accordingly, impeller clutch control may be optimized for each of the sub-time-steps in a predictive fashion based on a single instance of force data received by the processor(s) 302 from the input device 112 (or another input device). This explanation is provided to demonstrate one application of predictive analysis that the processor(s) 302 may provide, using the analytical model 314 during the course of a work operation.

The electronic control module 114 may obtain the fluidic pressure measurements 502-510 from one or more input devices such as, for example, the input device 112. Although the input device 112 is described in embodiments herein as providing force data to the electronic control module 114, it should be appreciated that the present embodiments are not necessarily limited to force data obtained from any particular input device described herein. The obtained force data may include multiple data from any number of the input devices, which may respectively include a single sensor or a plurality of sensors.

Turning attention again to FIG. 5, in an example embodiment, the machine 100 may be disposed proximate to the work pile 500. It should be appreciated that the example values for fluidic pressure measurement, impeller clutch engagement, torque, etc., as shown in FIGS. 5-9 are provided for the purpose of demonstrating one possible embodiment, and to exemplify one way the elements of fluidic pressure measurement, impeller clutch engagement, torque, and time may be interrelated. The provided values and system responses are provided as examples only, and are not meant to be specific or limiting.

Figure 5:
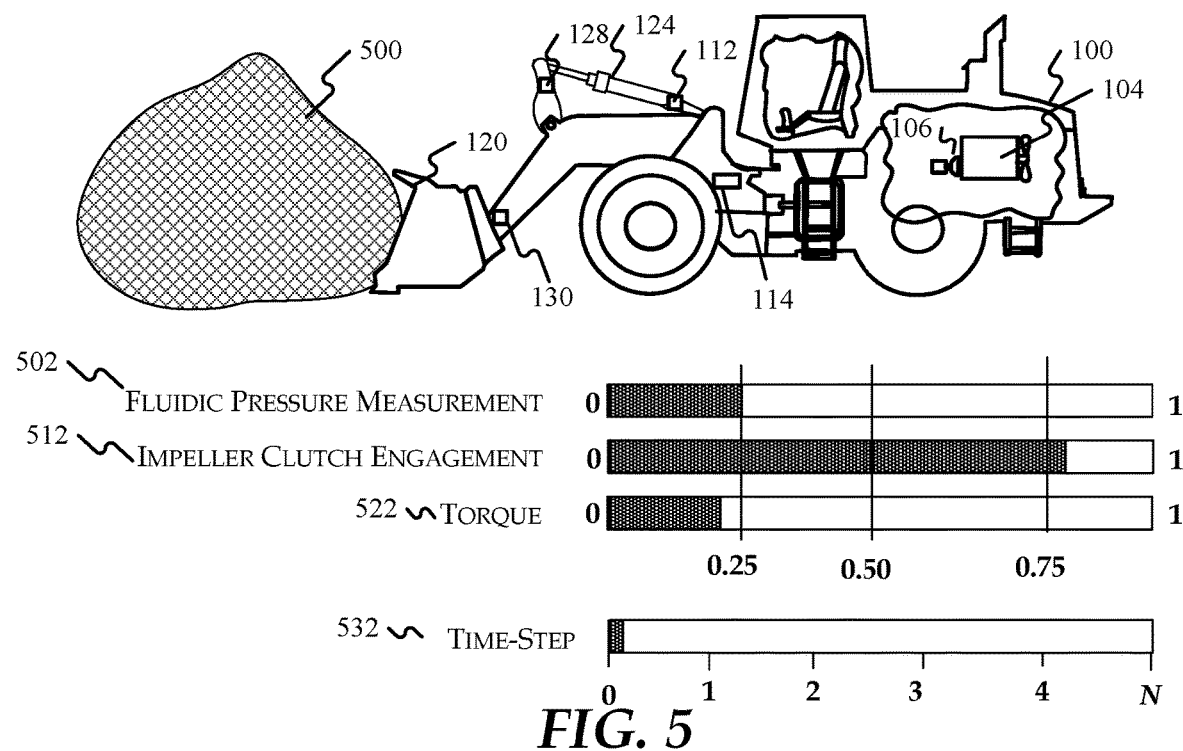
FIGS. 5-9 depict steps of the machine of FIG. 1 executing an impeller clutch control process, according to an embodiment.

According to one embodiment, machine operator (not shown) may lower the bucket 120 to a surface of the ground at the base of the work pile 500 before engaging the work pile 500 with the work tool 118. At time-step 532, the processor(s) 302 may automatically receive force data from the input device 112, which provides data indicative of the present circumstances associated with this work operation. In other aspects, in lieu of automatic receipt of the force data signal, the processor(s) 302 may query the input device 112 for data, and receive a data signal having the fluidic pressure measurement(s) responsive to the query. The fluidic pressure measurement 502 obtained by the processor(s) 302 at time-step 532 is shown to be approximately 0.25 of the total working pressure (from 0 being the lowest working pressure and 1 being the highest working pressure), as the force of the advancing machine 100 engages the bucket 120 into the work pile 500. The respective torque 522, which may generally be inversely proportional to the impeller clutch engagement, is shown in FIG. 5 as approximately 0.20 of the available torque 522. The processor(s) 302 may determine the value associated with the impeller clutch engagement 512 based on the fluidic pressure measurement 502, using the analytical model 314. The analytical model 314 may indicate that, given the present inputs, the impeller clutch engagement 512 that produces the torque 522 (e.g., the fluidic pressure measurement 502), is approximately 0.80 of full impeller clutch engagement.

Although not shown, the analytical model 314 may also instruct the processor(s) 302 to implement additional impeller clutch engagement values intervening the time-step 532 and time-step 534. The processor(s) 302 may engage the impeller clutch 106 as instructed by the analytical model 314 using the fluidic pressure measurement 502.

Figure 6:
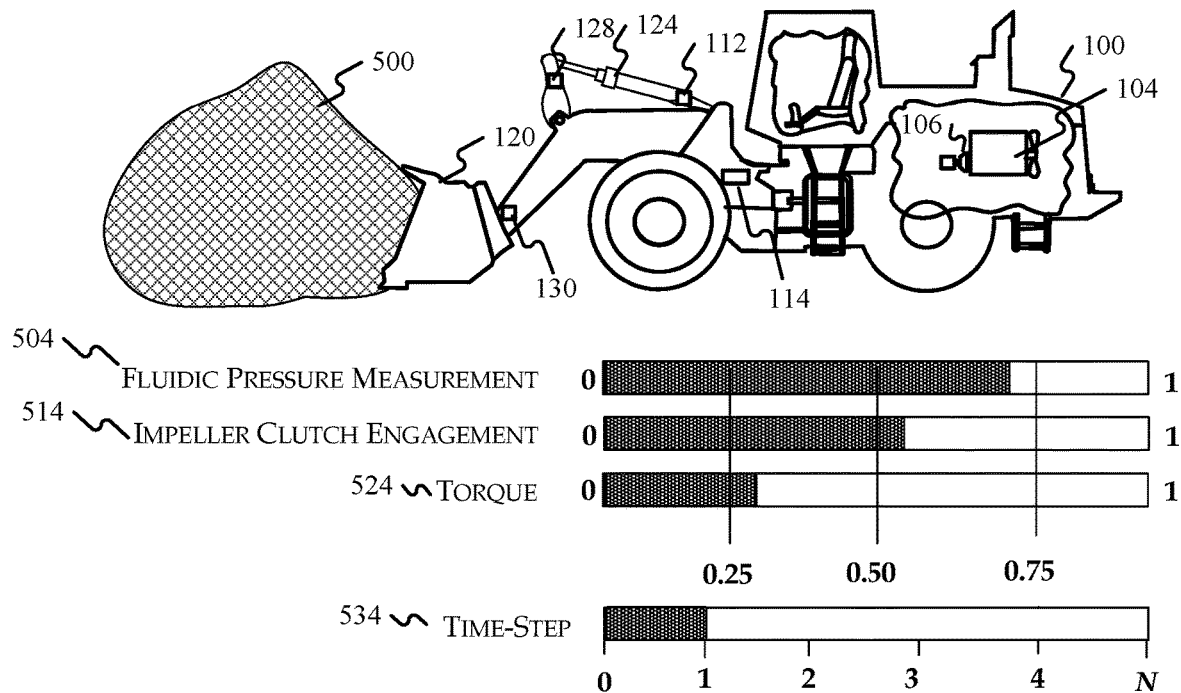

At FIG. 6, as the bucket 120 is depicted penetrating into the work pile 500, and the fluidic pressure measurement 504 shows one example system response of a pressure increase. For example, the fluidic pressure measurement 504 increases to approximately 0.70 of the working maximum hydraulic fluid pressure, as the torque 524 also increases (shown in FIG. 6 as about 0.30 of available torque), which may be needed to advance the bucket 120 into the work pile 500. At time-step 534, the processor(s) 302 may obtain the fluidic pressure measurement 504, and access the analytical model 314 to determine an impeller clutch engagement value based on the force data signal (the fluidic pressure measurement 504 in the present example), and the analytical model 314. Although described herein as a singular measurement, it should be appreciated that the fluidic pressure measurements are periodic and describe fluid pressure with respect to time. Based on the fluidic pressure measurement 504, the processor(s) 302 may engage the impeller clutch engagement 514, shown as about 0.60 of full impeller engagement. The reduced impeller engagement, in comparison with the impeller clutch engagement 512 as shown in FIG. 5, may produce increased torque 524 (increased with respect to the torque 522).

Figure 7:
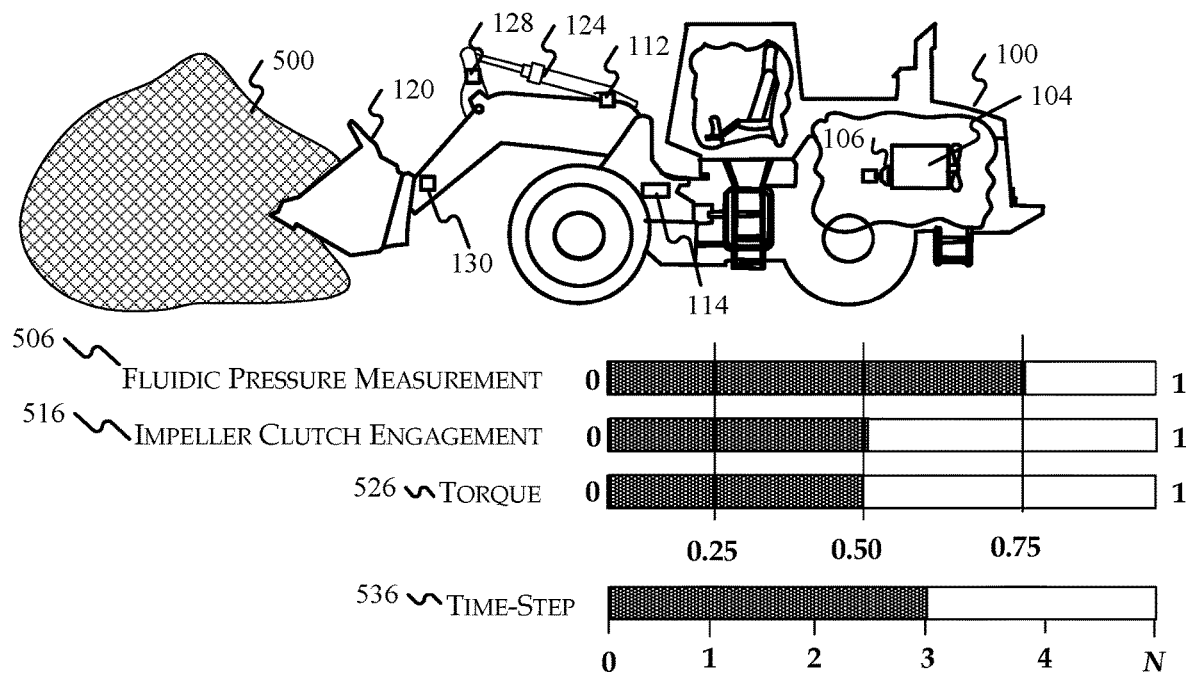

As shown in FIG. 7, as in a typical wheel loader bucket fill operation, at this point the operator (not shown) may ratchet up the bucket 120 from the surface of the ground, by increasing the upward angle of the bucket 120 with respect to the ground level. The increased angle may be observed by the processor(s) 302 by one or more inputs such as, for example, data from the input device 130. As the machine 100 begins to stall due to the resistance from the work pile 500 resisting forward movement of the work tool 118, the processor(s) 302 may receive the force data signal from the input device 112, which may include hydraulic fluid pressure data from the input device 112, that is configured for measuring hydraulic fluid pressure at the hydraulic lift cylinder 124. The processor(s) may also receive other force signals having observed machine characteristics such as, for example, an angle measurement, or hydraulic fluid pressure at another hydraulic cylinder (not shown) that actuates angular movement of the bucket 120. The processor(s) 302 may determine a value for the impeller clutch engagement 516 based on the force data obtained by one or more of the input devices 112, 128, and 130, and engage the impeller clutch 106 accordingly. The torque 526 may increase (for example, to approximately 0.5 of available torque, or some other value). The processor(s) 302, using the analytical model 314 may determine a particular impeller clutch engagement 516. The determined value may be based on the fluidic pressure measurement 506 (which in the case of FIG. 7, may also include angular information or fluidic pressure measurements at both the bucket and the hydraulic lift cylinder 124).

Figure 8:
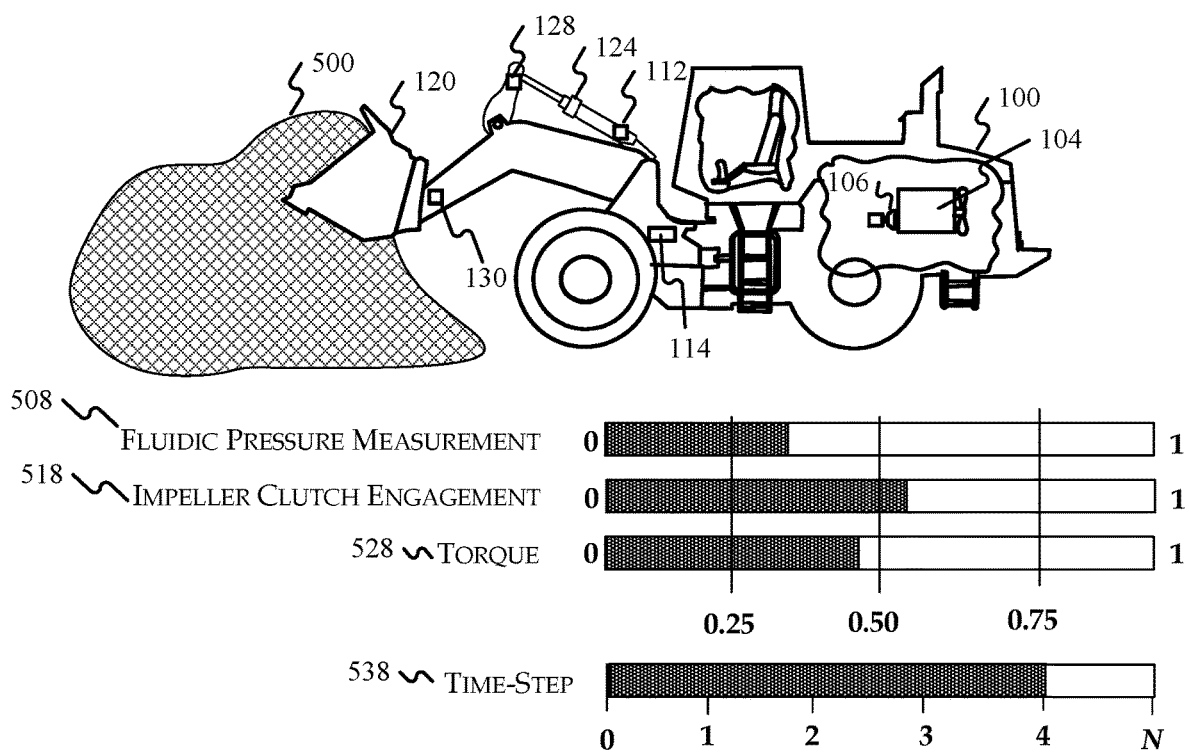

As shown in FIG. 8, as the bucket 120 begins to break through the work pile 500, the processor(s) 302 may apply an impeller clutch engagement value 518 (or alternatively, a time-stepped series of impeller clutch engagement values that are depicted as the impeller clutch engagement value 518), which prevents stalling of the machine 100 due to dynamic forces of the work pile 500. The forces are considered dynamic because the material in the work pile shifts due to disturbance from the work tool 118, gravity, etc. The processor(s) 302 may thus provide smooth, efficient impeller clutch control, as the dynamic forces of the work pile 500, and bucket 120 (which may have dynamically-changing mass as it becomes full) affect the forward-progress of the machine 100. Accordingly, as the bucket 120 begins to break through the work pile 500, the processor(s) 302 applies the corresponding amount of impeller clutch engagement value 518 to accomplish the torque 528 at an efficient rate (which may be, in the present example, approximately 0.40 of available torque, and which may be time-stepped with multiple impeller clutch engagement settings not shown that intervene time-steps 536 and 538). It should be appreciated that the determined amounts are described as efficient, optimized, etc., because hundreds or thousands of similar training digs may be used to develop the analytical model 314. The machine learning system 1100 may train the analytical model 314 based on statistical methods applied to machine learning that are known to produce optimized values for specific inputs (e.g., characteristics of interest such as the fluidic pressure measurement 508). Stated in another way, one benefit of a machine learning system such as the system described hereafter with respect to FIG. 11 is that the trained model may apply learned observations from the hundreds or thousands of examples. If a human operator manually operates the impeller clutch 106, an incorrect, insufficient, or non-application of impeller clutch engagement may cause the hydraulic lift cylinder 124 to raise the lift arm 122 too quickly, which would likely result in a partially-full bucket. The system 102 may produce an optimal amount of the impeller clutch engagement value 518, such that the bucket 120 emerges from the work pile 500 with a full load of material, such that a human operator can fill the bucket 120 with minimal fuel, and minimal expended time without need of particular expertise.

Figure 9:
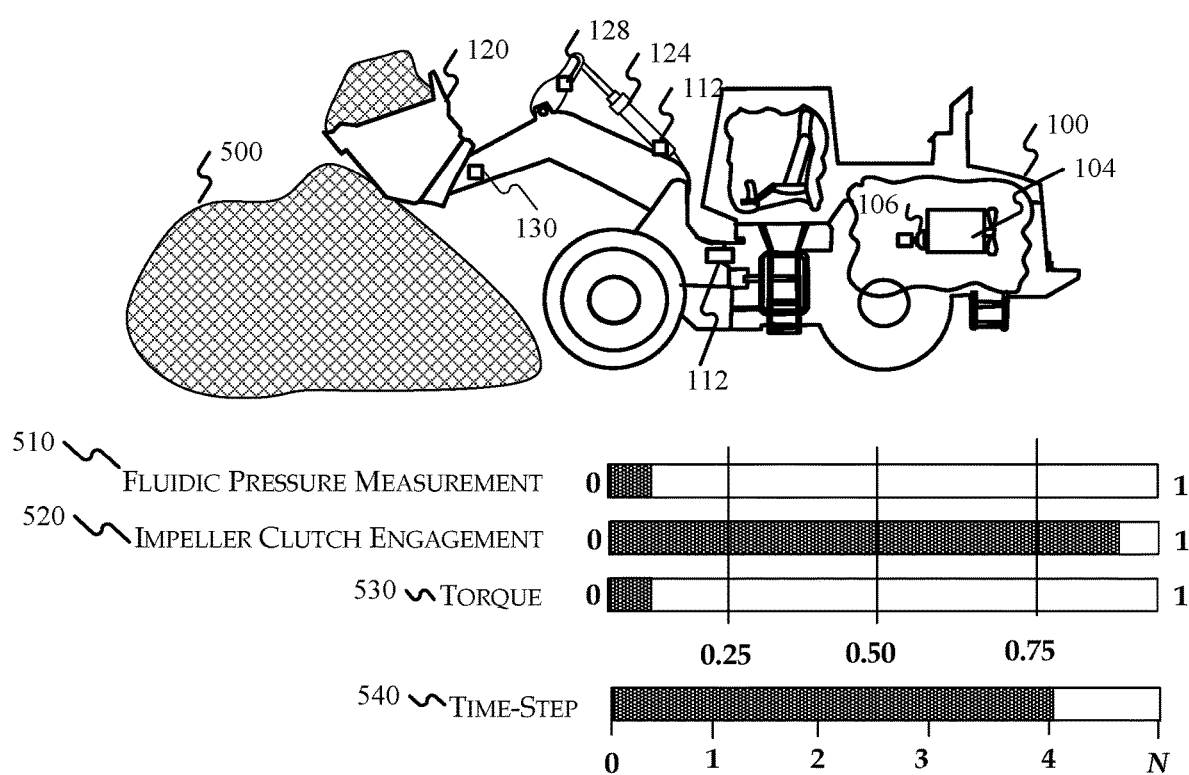

As shown in FIG. 9, the machine 100 may continue with the work task by filling the bucket 120. Accordingly, at the time-step 540, the processor(s) 302 may obtain the fluidic pressure measurement 510 from the input devices (e.g., one or more of the input device 112, the input device 128, and/or the input device 130). The fluidic pressure measurement 510 is shown in FIG. 9 as approximately 0.1 of full working pressure. In the present figure, the relatively lower fluidic pressure measurement may indicate that the bucket 120 has broken free from the work pile 500 filled to full-capacity. Accordingly, the processor(s) 302 may determine the impeller clutch engagement 520 (shown as about 0.90 of the full engagement). The analytical model 314 may determine that the nearly-full impeller clutch engagement level predictably will produce the torque 530, which may be optimal (as determined by the analytical model 314) to maneuver the machine 100 and unload the bucket 120 without undue expenditure of fuel. Stated again, the analytical model 314 may determine optimized values for controlling the impeller clutch with a volume of training data that provides example system responses in various situations.

Figure 10:
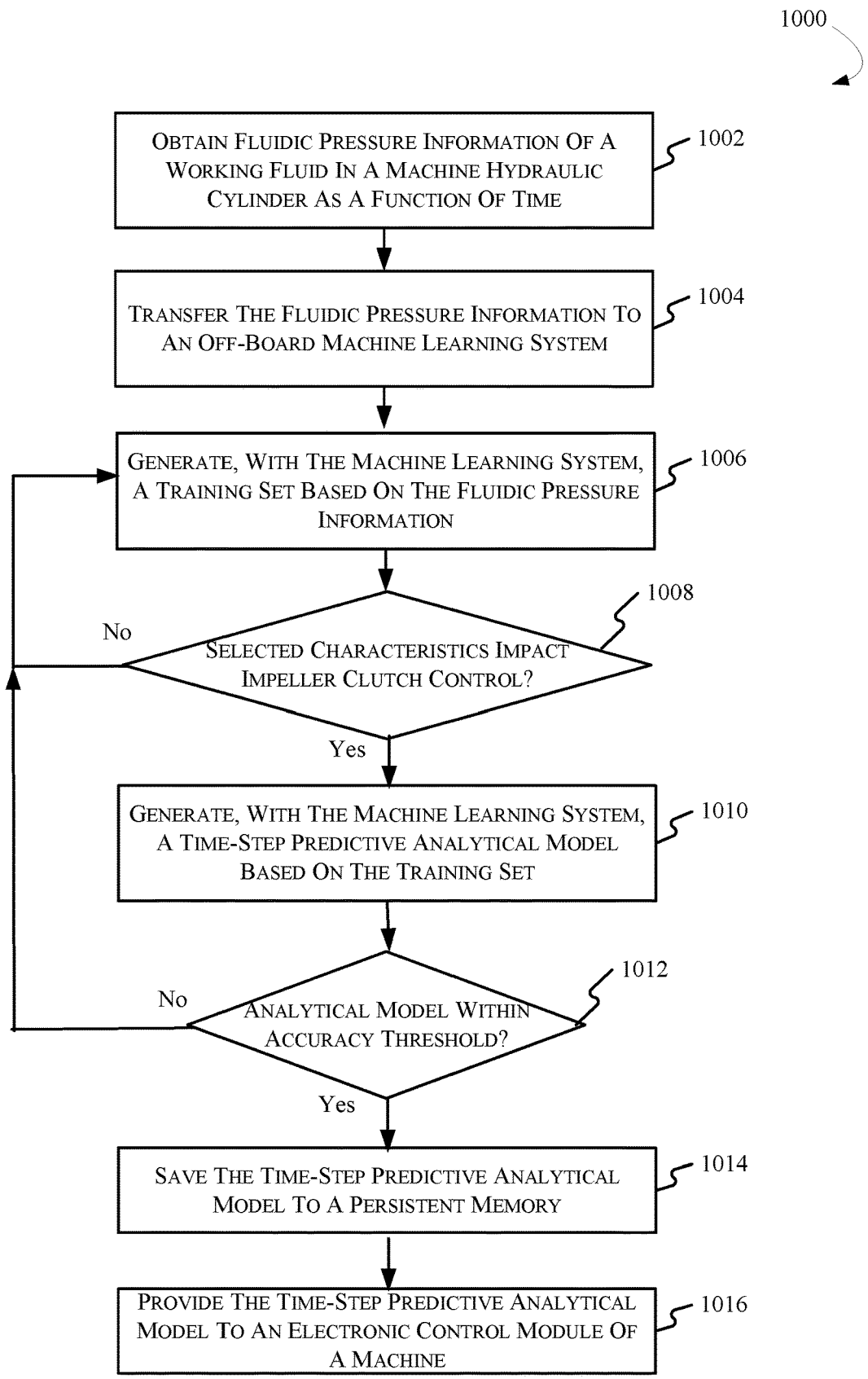
FIG. 10 illustrates a pictorial flow diagram of an example process for training a time-step predictive analytical model for impeller clutch control using a machine learning system, according to an example embodiment.

FIG. 10 illustrates a method 1000 for training the analytical model 314 for impeller clutch control using a recurrent neural network, according to an example embodiment. Before describing the method 1000 in greater detail, a brief overview of machine learning technology applicable to the present embodiments is provided. Generally, machine learning refers to scientific study of algorithms and statistical models that computer systems use to progressively improve their performance on a specific task. Machine learning algorithms are often built using one or more mathematical models of sample data, referred to herein as training data, to make predictions or decisions without being explicitly programmed to perform the task. For example, as used herein, machine learning techniques (and more specifically supervised machine learning) can provide statistical models and algorithms that provide predictive analytics for system responses to specifically-described feature data such as force information that includes fluidic pressure information, torque data, kinetic information, environmental information, and fluidic flow rates, among other information described above.

Supervised learning algorithms may be used to build a mathematical model of a set of data (training data) that contains both the inputs such as force data and other characteristics of interest, and the desired outputs, such as impeller clutch engagement values and/or machine torque. As the case in many machine learning algorithms, the training data may include a set of training examples. In embodiments described herein, the training examples may be distilled from the telematics data using a machine learning system (such as, for example, the machine learning system 1100 described with respect to FIG. 11). The training examples may mathematically define control of a machine that has components in common with the machine 100, including an impeller clutch, a hydraulic lift cylinder, etc. In other aspects, the training examples may define control of machine tractive effort (aka rimpull, crowd force, etc.) in powertrain designs that use different mechanisms, such as, for example electric and hydraulic continuously variable transmissions. Traditional powertrains without a clutch may use an electric motor, or hydraulic variator to directly control torque, and may crudely reduce engine speed as an indirect means of reducing torque. In other aspects, non-clutch-driven powertrains may neutralize the transmission as a crude means of completely dropping torque. It should be appreciated that, although embodiments are described first as controlling clutch engagement, it should be appreciated that output torque may also be modulated using the systems and methods described herein. For example, the training examples may include one or more inputs (e.g., the force data) and a desired output (e.g., the impeller clutch engagement values, torque modulation values), also known in the art as supervisory signals, and referred to herein as characteristics of interest.

In the mathematical model, the training examples obtained through the telemetric data may be represented by an array or vector, and the training data may be represented by a matrix. Through iterative optimization of an objective function, supervised learning algorithms may learn one or more functions associated with impeller clutch control and/or machine torque control that can be used to predict an output (e.g., torque engagement values and/or machine torque) associated with various inputs (e.g., force data that expresses values indicative of a lift cylinder velocity, lift cylinder head-end pressure, lift cylinder stalled status, bucket angles lift linkage angles, tilt command valve information, etc.). An optimization function can allow the algorithm to correctly determine an optimal clutch engagement and/or machine torque output for given force data inputs that were not a part of the training data. An algorithm that improves the accuracy of its outputs or predictions over time is said to have learned to perform that task.

Supervised learning algorithms may include classification algorithms and regression algorithms. Classification algorithms may be used when the outputs are restricted to a limited set of values, and regression algorithms may be optimally used when the outputs may possibly have any numerical value within a range. Accordingly, because there are predictable ranges for the feature data described herein, regression algorithms may be a preferred training method for embodiments described herein.

Machine learning can generally include several steps: Data collection and preparation, feature selection, building and training the analytical model, evaluating the trained model, and training the model to optimize outputs (e.g., tuning the model). For at least the first three machine learning operations, it may be preferable to use an artificial neural network as a framework for the predictive analytical model.

An artificial neural network, as used herein, may be a computing platform based on a collection of connected units or nodes (sometimes called artificial neurons), which may be loosely model the neurons in a biological brain. Each connection can transmit information from one artificial neuron to another. An artificial neuron that receives a signal can process it and then signal additional artificial neurons connected to it. In common neural network implementations, the signal at a connection between artificial neurons may be a real number, and the output of each artificial neuron can be computed by some non-linear function of the sum of its inputs. One type of artificial neural network that may be a complementary framework for the analytical model 314 may be a recurrent neural network. For example, a gated recurrent unit (GRU) neural network may be well-suited to generate the analytical model 314, because of its utility in determining optimized weights for particular values of input. Other analytical model architectures for sequential prediction known by one skilled in the art may be also used, such as, for example, a temporal convolutional network.

For example, a GRU network may use back-propagation and stochastic gradient descent to find optimal sets of weights that predict what every time step in the impeller clutch engagement and/or torque response should have been. In the example described with respect to FIG. 5, the time-step 532 may have a plurality of smaller increment steps (not shown) between time increments 0 and 1. Where the fluidic pressure information is obtained at each time step, the analytical model 314 may provide, for each of the plurality of smaller increment steps, values for the impeller clutch engagement 520. Back-propagation and stochastic gradient descent methods may also be effective in determining optimal weights that can effectively increase the accuracy of the analytical model 314. The weights for analytical model inputs may be developed by a machine learning system (e.g., the machine learning system 1100) by training the system with telematics data, or portions of the telematics data.

For example, as a brief overview of how an analytical model such as the analytical model 314 is trained, the machine 100 may be used in a training dig to obtain fluidic pressure information of a working fluid (not shown) with respect to time during the training dig. The fluidic pressure information can originate from one or more sensors positioned in various areas of the machine 100. For example, the fluidic pressure information may be obtained from direct pressure measurement of a hydraulic cylinder that may be fluidly connected with the working fluid, obtained from moving parts of the machine 100 as kinetic force values, angular momentum, or other such values obtained from or near drivetrain components. In another example, one or more sensors may be positioned to obtain kinematic information as a function of time, or position information with respect to time, etc. Many of such sensors were described with respect to FIG. 2. The fluidic pressure information (and other information) may be recorded on-board the machine 100 using the system 102 (FIG. 2) to produce and record time-step sequences of values. The fluidic pressure information may be included as part of the telematics data (recorded on-board the machine 100). The telematics data may include many channels of information (from instrumented sensors shared by multiple machines, and some channels of information associated with a subset of the work machines). For example, the fluidic pressure information may be a time-step set of values (or a plurality of sets) recording fluidic pressures of a working fluid in the machine 100, on one or more channels, over the course of time.

The telematics data can include recorded sets of time-step values, where the values indicate and/or include time-stepped observations of mechanical, functional, and environmental conditions recorded on-board the machine 100 (and/or other machines) during the training dig(s). The recorded sets of values may include time-stepped observations recorded as time-sequenced information sourced from any number of separate channels. For example, the machine 100 may record multiple kinematic channels configured to provide input data associated with machine movement during the training dig(s). Example kinematic channels can include linkage angles, inertial measurement unit (IMU) output, fluidic pressures, machine speeds, steering angles, etc. Moreover, channel data can include information indicative of how these types of input data change with respect to time. Accordingly, single channel data may describe fluidic pressure values measured and/or otherwise observed at one or more locations of the machine 100, such as at the hydraulic lift cylinder 124, or at another location described with respect to FIG. 2. The machine 100 may sense various drivetrain channels as part of telematics data, such as, for example, telematics data that records time-sequenced values associated with transmission torque, engine speed, operational gear changes, etc. The drivetrain channels may also include information indicative of how drivetrain-related sources of input data change with respect to time. The machine 100 may record the telematics data various drivetrain channels in a computer-readable memory either on-board or off-board the machine 100.

The machine 100 may also include environmental factor channels associated with physical aspects of the working environment. Environmental factor channels can include temperature, precipitation, humidity, and other weather-related factors that may affect the work environment. In other aspects, the environmental factor channels can include work site information associated with a physical aspect of the work pile (e.g., the work pile 500). For example, a work pile evaluator channel may include a computer-analyzed feed of observed work pile makeup, where the computer-analyzed feed describes the material being moved by the machine 100. An example material may be sand, aggregate, mixed-media (cement and soil), pebble, road base material, asphalt, etc. Accordingly, an environmental factor input device, such as a camera, may obtain live video information of the work site, an electronic control unit may analyze the video information to determine the makeup of the work pile, and transmit a time-step data signal comprising perception data to the electronic control module 114, where the perception data is indicative of the environmental condition that may affect the accuracy of a particular analytical model used for predicting the impeller clutch engagement values and/or torque control values.

The machine 100 may record the telematics data, which may include multiple channels simultaneously recorded during a dig event (e.g., a training dig). For example, the telematics data is determined by one or more sensors (e.g., the input devices 112, 128, 130, etc.), the sensors send signals to the processor(s) (e.g., the processor(s) 302), and the processor(s) store the information in the signals within a memory (e.g., the memory 310). The machine learning system described herein may use the telematics data as an input, process the telematics data by segmenting it into portions that may, in turn, be used to train an analytical model. Once an analytical model is trained, the model may be configured in an electronic control module of a machine (e.g., the machine 100), to receive inputs in real time, and output a control output based on the real-time inputs. For example, the fluidic pressure information may be used as the real-time input, or it may be coupled with other observations to output control signals such as, for example, an impeller clutch control signal that causes the processor(s) 302 to engage and disengage an impeller clutch of the machine 100 in real time, and/or generate and transmit a torque output control signal that modulates the machine 100 torque response in real time.

Now directing attention to FIG. 10, a flow chart of a method 1000 is shown, according to an embodiment. The method 1000 describes methods for training the analytical model 314. At step 1002, the system 102 may obtain fluidic pressure information of a working fluid in a machine hydraulic cylinder as a function of time. The system 102 may obtain fluidic pressure information of a working fluid in the machine 100 hydraulic lift cylinder 124 (or another input device) as a function of time. The system 102 may obtain data from a single channel, or from multiple channels simultaneously. For example, in some aspects, only the fluidic pressure information may be obtained by the system 102 and/or the machine learning system 1100.

The machine learning system may obtain the fluidic pressure information during one or more training dig events, where a human operator controls the machine 100 (or a similar machine), and the system 102 records a plurality of channels simultaneously as the telematics data described herein. Although described herein as a single dig event, it should be appreciated that telematics data obtained during multiple training dig events may be used for training the analytical model 314. For example, the telematics data obtained from a plurality of training dig events may be compiled by an off-board machine learning system (that is, a system that is remote from and/or otherwise distinct from the machine(s) described herein). As a practical matter, obtaining the fluidic pressure information for training the analytical model may include compiling tens, hundreds, or perhaps thousands of telematics data, where the telematics data are respectively sourced from a different training dig event. The training system (e.g., the machine learning system 1100, as described hereafter with respect to FIG. 11) may process a plurality of training dig events in the machine learning system 1100. A single training event may include the telematics data recorded during the training dig event, where a human operator performs the dig event using a machine similar to the machine 100, and the system 102 records the various channels of data simultaneously. The machine learning system 1100 may compile the telematics data that were previously recorded on-board the human-operated machine(s) during the dig event(s). The compiled telematics data (e.g., the telematics data 1122) may be used to generate the training set that associates aspects of the telematics data with other observations recorded during a plurality of dig events. If the analytical model 314 is a neural network, the training set may be a preliminary structure similar to the analytical model 314, and may include neural net weights and biases associated with the trained aspects of the telematics data from the training dig events. With an adequate number of training dig events, the analytical model 314 (when executed by an electronic control module in a machine) may operate aspects of the machine 100 in a wide array of situations, soil types, machine responses, operator procedures, etc.

The system 102, used for control of the impeller clutch and/or torque output of the machine 100, may also operate as a data collection system that obtains the telematics data during the training dig events. The telematics data may be saved in a computer memory (e.g., the memory 310 as shown in FIG. 3), and/or may be transmitted to one or more connected devices via a transceiver(s) on-board the machine 100 (e.g., the transceiver(s) 308). The one or more connected devices may be, for example, the computer 1102 shown with respect to FIG. 11. The telematics data 1122 may further include raw data from a plurality of data channels on-board the machine (e.g., the plurality of machines 1124). Accordingly, obtaining the fluidic pressure information may include obtaining data from a single data channel (e.g., fluidic pressure values with respect to time), or it can include obtaining a plurality of time-step information from a plurality of channels, (e.g., the telematics data 1122) of which the fluidic pressure values with respect to time may be only a single aspect among a plurality of simultaneously recorded data channels. More particularly, the system 102 (on-board the machine 100) may record the telematics data during the training dig event(s), and save the telematics data on-board a computer memory operatively connected with the electronic control module 114 on-board the machine 100 performing the recording.

At step 1004, the machine learning system 1100 may transfer the fluidic pressure information from one or more of the plurality of machines 1124 to the machine learning system 1100. The data transfer may be wired or wireless data transfer. Looking briefly at FIG. 11, one or more of the plurality of machines 1124 may provide the telematics data 1122 to one or more computers of the machine learning system 1100 (e.g., the computer 1102) via one or more transceiver(s) (e.g., the transceiver(s) 1110 as shown in FIG. 11). After one or more training dig events has taken place, the machine learning system 1100 may provide (i.e., transmit, transfer, stream, etc.) the telematics data to the computer 1102 from the one or more electronic control modules (e.g., the electronic control module 114 as shown in FIG. 1) on-board the machine 100 via wired or wireless data transfer method. Once transferred to the machine learning system 1100, the machine learning system 1100 may store the telematics data 1122 in a computer memory such as, for example, a telematics data storage 1120, or in another computer memory (e.g., memory 1112).

At step 1006, the machine learning system 1100 may generate a training set (such as, for example, the training set 1116, as shown in FIG. 11) based on the fluidic pressure information. The analytical model 314 can be trained on the training set 1116 using a supervised learning method (e.g. batch gradient descent or stochastic gradient descent). In practice, the training dataset may include pairs of an input vector (or scalar) and the corresponding output vector (or scalar), which is commonly denoted as the target (or label). As described herein, analytical model 314 can be a recurrent model that may be iteratively trained by processing the training data extracted from the telematics data 1122, to produce an output that can be compared with the target data (e.g., the observed system responses from the telematic data). Based on a result of the comparison, and the learning algorithm being used, the features of the training set 1116 and/or the parameters and hyperparameters of the analytical model 314 may be adjusted using the iterative techniques described hereafter. The iterative approach to model fitting can include both feature selection and feature engineering, as understood in the art.

The training set 1116 may include raw data having multiple channels, where one or more of the channels can be isolated from the telematics data 1122. For example, the machine learning system 1100 may isolate data of interest from the telematics data 1122 by removing extraneous channel data from the telematics data 1122 such that only the data of interest remains, and reshape the isolated data into the training set 1116. The machine learning system 1100 may construct a computation graph involving a tensor structure from the isolated data. The training set 1116 may be, at its core, a tensor structure. As appreciated in the art of machine learning, a tensor structure may be embodied as a data object (or a container) that can house data in N dimensions. It may subsequently be processed by a computation graph represented by linear and non-linear operations of that data. Accordingly, the dimensions of the N dimensions in the tensor structure, as described herein, can include various channel data extracted from the telematics data 1122. Examples of the tensor structured data may include system response values such as, for example, time-stepped values for machine torque output, fluidic pressure, kinetic channel data, drivetrain channel data, environmental channel data, etc. The computation graph can include descriptions of the linear and non-linear transformations between different tensors. Stated another way, a computation graph can include mathematical operations and non-linear activation functions applied to the fluidic pressure and other tensor-structured channel data during the course of a training dig. Examples of such mathematical transformations, or relations, can include the cross product and the dot product of two matrices of values, where the values are associated with characteristics of interest such as fluidic pressure information and other channel data.

The machine learning system 1100 may construct the tensor structure using one or more data sequences extracted from the telematics data 1122, where the sequences represent values for characteristics of interest over time. The one-dimensional sequences may be, for example, the fluidic pressure values with respect to time, with pressure value samples taken periodically (e.g., 1 second intervals, 5 second intervals, etc.). The machine learning system 1100 may reshape the tensor structure size for running through the analytical engine 316 during a testing phase by generating sequences of equal length time intervals. For example, one-dimensional data such as time-step fluidic pressure values observed during a multitude of digs may be re-shaped into sequences of equal length (or approximately equal length) time intervals.

Generating the training set 1116 may include iteratively improving the training set 1116 with additional features to test whether that particular feature improves or diminishes the training set 1116. Adding a new feature vector can include isolating the channel information from the telematics data, and processing the time-step data as a feature vector. As explained hereafter with respect to FIG. 11, a system processor (e.g., one or more processor(s) 1104) of the machine learning system 1100 may isolate one or more characteristics of interest from the telematics data 1122, such as fluidic pressure indicative of a lift cylinder velocity, a lift cylinder head-end pressure, a lift cylinder stalled status, a lift linkage angle, a work tool angle, a tilt command valve position, etc.

Isolating a characteristic of interest from the telematics data 1122 can include, for example, extracting a single channel from the telematics data 1122 such that the machine learning engine 1114 (FIG. 11) may isolate time-step values for a single channel, and saving the time-step values as one or more independent one-dimensional arrays of values.

In another aspect, isolating a characteristic of interest can include extracting a single channel from a multitude of training digs saved in the telematics data 1122, and performing one or more mathematical operations on the extracted feature vector data that combines the various sets of feature vectors (from the multiple training digs) into secondary calculated channels. These secondary calculated channels may be combined together with the raw channels to form a single master feature vector. The operations may include temporal averaging of specific channels of the multitude of feature vectors of the multiple training digs represented in the telematics data 1122, performing a temporal statistical computation of the extracted channel information, and/or performing other mathematical operation on the feature vector data such that a resultant output of the extraction includes the single label and a single set of feature vector values. At a minimum, the feature vector of interest can include the fluidic pressure values extracted from the telematics data 1122.

The training set 1116 may be a three-dimensional data structure storing a set of values for fluidic pressure measurements with a set of impeller clutch engagement values and/or machine torque values. The training set 1116 can include a table having columns of information organized as features (feature vectors), and rows of information organized as instances or observations of respective features. Once trained, the analytical model 314 model can describe and predict a relationship between features that are input to the system (e.g., fluidic pressure) and the machine output values (e.g., impeller clutch engagement and/or torque output).

Generating the training set can further include separating and/or segmenting the telematics data 1122 into two distinct data sets that include a training portion and a test portion. The training portion may be used to create the training set(s), and thus, can often be the largest of the two portions. For example, a larger proportion of the telematics data 1122 may be segmented into the training portion because the increased number of observations used for training a model can increase the accuracy of the analytical model. When the number of recorded observations is relatively large, the training set may become increasingly complete as more combinations of inputs and outcomes are observed and correlated by the machine learning system 1100. When the machine learning system 1100 has an input dataset that is sufficiently large (e.g., the training portion includes tens, hundreds, and/or thousands of examples of training dig information), the trained analytical model 314 can handle any number of real-life dig situations in a way similar to a human operator.

The test portion may be substantially smaller than the training portion (e.g., the test portion may be 5%-20% of the overall body of telematics data 1122, whereas the training portion may be 80%-95% of the telematics data 1122). The test portion may serve as the input to a trained model (e.g., the analytical model 314 trained with the training data 116). In another embodiment, the machine learning system 1100 may segment the telematics data 1122 (which may be raw data recording a plurality of data channels on-board the machine 100, during a plurality of test digs) into three data sets, including a training portion, a validation portion, and a test portion. The validation portion may be segmented as a distinct and separate portion of the telematics data 1122 to avoid overfitting the analytical model 314 to a held-out dataset during hyperparameter optimization. Accordingly, as understood in the art of machine learning, during a validation process for validating the training set, without segmenting a third portion for validation that is not used in training, an inaccurate model may result and yet remain undetected during the testing phase, where the errors are be attributed to iteratively training the analytical model against the test data while varying the hyperparameters. For example, when the analytical model 314 is embodied as a neural network, the machine learning system 1100 may iteratively generate the neural network by passing extracted feature vectors from the training portion of the telematics data 1122 into the training set 1116, to identify an output for a given set of inputs.

An iterative process of passing extracted feature vectors through the training set 1116 is described in the following steps (e.g., step 1008 and step 1010), where the machine learning system 1100 may select one or more inputs (which may include inputs associated with fluidic pressure) and test the inputs during the training phase, to select the best features which have unique informational content and by identifying and eliminating particular combinations of inputs with correlations. Combinations of inputs can include, for example, time-sequenced inputs of fluidic pressure values, combined with one or more other inputs such as, for example, an angular momentum of the work tool with respect to time, etc. For example, the machine learning system 1100 may be configured to identify a known correlation between specific inputs, where those inputs are known to be predictive of the system response. Examples of known correlations of inputs may include inputs such as fluidic pressure and machine torque output, fluidic pressure and angular momentum of a work tool, etc. In other aspects, the machine learning system 1100 may identify an unknown correlation between the inputs through machine learning techniques. For example, previously unknown correlations between machine torque output and/or impeller clutch engagement may exist that would be indistinguishable by a human observer alone, where only a machine learning system such as the machine learning system 1100 could detect the correlation using known techniques.

At step 1008, the machine learning system 1100 may determine whether the selected characteristics (e.g., the one or more inputs described above) have an impact on the impeller clutch control. Accordingly, the machine learning system 1100 may select one or more characteristics of interest as inputs, and evaluate whether the selected characteristic(s) impact the impeller clutch control. For example, the machine learning system 1100 may isolate, in one or more of the training data portion and the test data portion, a second channel data set associated with at least two channels of the plurality of data channels, where the second channel data set can include the second fluidic pressure information associated with the observed machine torque response values and/or impeller clutch engagement values, and can also include a second data channel data set. In one embodiment, the second channel data set may include a set of values indicative of one or more of i) a lift cylinder velocity, ii) a lift cylinder head-end pressure, iii) a lift cylinder stalled status, iv) a lift linkage angle, v) a work tool angle, and/or vi) a tilt command valve position. Other channel data is contemplated, and thus, the enumerated channel data examples given herein are not meant to be exclusive.

Once the machine learning system 1100 selects a set of inputs, the inputs for the selected feature vector may be iteratively extracted as the one-dimensional training set 1116 and fit by the analytical model 314 to evaluate any difference between the outcome of the analytical model 314 and an expected outcome (e.g., an observed system response value) observed by the real-life data recorded during training dig(s). The difference may be expressed as a numeric value indicative of a system response error that can be compared to an acceptable threshold value for error. The training process may be iterative in that it selects two or more channels of data that are known to be associated with predicting impeller clutch engagement values, or that may be associated with predicting torque output values. When the degree of error in any given iterative test falls within an acceptable degree of error (e.g., 95% accurate, 80% accurate, etc.), the machine learning system 1100 may correlate the two or more channels and confirm that the correlation has a material impact on the resultant analytical model (e.g., the analytical model 314) that increases an accuracy of control output. It should be appreciated that the predetermined thresholds described herein are example threshold values only, and should not be considered limiting.

According to one embodiment, determining a response error may be accomplished using various known techniques, including for example, correlation coefficient comparison of various input channels compared to the output channel(s) associated with the system response. In another aspect, determining the response error may include recursive feature elimination, where the analytical model 314 is built using combinations of the input channels from the training set 1116. This process recursively groups input channels into fewer and fewer combinations until a critical few input channels remain as part of the training set 1116 that have a notable positive impact on system response accuracy (or stated in another way, create a system response having a minimized system response error).

At step 1010, based at least in part on determining that the first system response error is less than or equal to the threshold error value, the machine learning system 1100 may generate the analytical model 314 based on the training set 1116. The process may be iterative such that the analytical model 314 is generated from a first version of the training set 1116, where other training sets generated did not increase the accuracy rate when tested with the test data portion. In other aspects, a subsequent training set may be used to generate the analytical model 314, as the subsequent training set(s) improve the accuracy of the analytical model 314, while maintaining a predetermined model size that may be supported by an electronic control module in applied use. A model size of the analytical model 314 may refer to a size in megabytes of data, and/or may refer to a processing cost associated with executing the model on an electronic control module.

The training process may be iterative in that, when a calculated degree of error falls outside of the predetermined threshold for accuracy, the machine learning system 1100 may replace one or more of the channels with one or more different channels, or simply remove the one or more channels. For example, at step 1012, the machine learning system 1100 may determine whether the analytical model 314 generates output within a predetermined threshold for accuracy. More particularly, the machine learning system 1100 may generate the training set 1116 that includes fluidic pressure information associated with observed machine torque response values or impeller clutch engagement values, and, once the analytical model 314 is trained, compute a plurality of test system response values using the test set 1117. The machine learning system 1100 may compare the first plurality of test system response values with a plurality of observed machine torque response values, and determine, based at least in part on the comparing, a system response error.

At step 1012 the machine learning system 1100 may determine whether the analytical model 314 produces a result within a predetermined threshold for accuracy. The testing and refining process may continue multiple times using the test set 1117, until the degree of error between the system response generated by passing the test portion of the telematics data 1122 into the test set 1117 reaches a consistent and acceptable minimum with respect to observed system response values (again, extracted from the test portion of the telematics data 1122). For example, multiple training dig data sets may be extracted from the telematics data 1122, and may be processed into the training set 1116 by isolating, in one or more of the training data portion and the test data portion, a second channel data set associated with at least two channels of the plurality of data channels. In some aspects, the second channel data set can include the fluidic pressure information associated with the impeller clutch engagement values, and also include a second data channel that was observed in step 1008 to impact the impeller clutch control of the machine 100. The machine learning system 1100 may compute a second plurality of test system response values based, at least in part, on a second training set associated with an observed machine torque response.

In practical application, the impeller clutch control system may operate on an electronic control module of a machine (e.g., the electronic control module 114). In some aspects, electronic control modules may have a limited computational capacity. For example, processing speed, computer memory, etc. may limit the electronic control module 114 to processing predictive analytical models up to a particular data size, because the electronic control module may also perform other computational tasks associated with machine 100 function. In other aspects, the electronic control module 114 may be dedicated to a singular purpose of controlling machine torque and/or impeller clutch engagement, and still have practical limitations with respect to analytical model complexity and size. In view of this balance between accuracy and operability, while accuracy of the analytical model 314 may increase with added channels and complexity, the accuracy may be outweighed by the computational cost needed to run the model. Therefore, it may be advantageous to add a plurality of channels (e.g., multiple characteristics of interest) to the training set 1116 until a minimum error is consistently observed when processing the test set 1117. Moreover, in view of balancing computational cost, it may be advantageous to remove one or more of the characteristics of interest from the training set 1116, and evaluate the effect on the overall error. It may also be advantageous to remove one or more characteristics of interest that have relatively small impact on the overall response error. Although in one aspect the error may increase by removing the one or more channels from the training set 1116, if (after evaluating test data with the reduced channel training set) the resultant error falls within the threshold of allowable error, the relatively higher error may be preferable over the increased computational cost. For example, if the error may be decreased by 1.5% when two additional channels are incorporated into the training set 1116, yet the incorporation of those same two channels increases the computational workload on the ECM by a disproportionate amount (e.g., 10%, 20%, 50%, etc.), it may be advantageous to select the increased system response error in view of a simplified analytical model. The reduced workload for the processor(s) 302 of the electronic control module 114 may outweigh the increased efficiency of the more complex model.

Accordingly, at step 1012, the machine learning system 1100 may determine whether the analytical model 314 generates data within the accuracy threshold, and also determine whether the analytical model 314 created at the prior step 1010 may be tuned by adding or removing additional channels.

At step 1014, responsive to determining that the second system response error is less than or equal to a threshold value for system response error, and responsive to determining that the second system response error is less than the first system response error, the machine learning system 1100 may generate the analytical model 314 based on the training set 1116.

When a degree of error between the expected system response generated by the test set results in a minimized loss (error) when compared to the actual system response observed during the test dig(s), then the training process may be considered complete. At step 1014, the machine learning system 1100 may save the parameters of the analytical model 314 to a persistent memory (e.g., the analytical model data storage 1118).

At step 1016, the machine learning system 1100 may provide the analytical model 314 to an electronic control module of the machine 100 (e.g., the electronic control module 114 as shown in FIG. 3) for use in a live dig scenario. Flashing the analytical model 314 to the electronic control module may include transmitting the analytical model 314 from the analytical model data storage 1118 to one or more of the plurality of machines 1124 via the transceiver(s) 1110, or via another wired or wireless connection.

FIG. 11 depicts the machine learning system 1100 (hereafter "system 1100"), according to an embodiment. In one aspect, the machine learning system 1100 includes a computer 1102, that may be operatively connected with one or more of a plurality of machines 1124. The computer 1102 may be off-board the machine 100, and may be operatively connected to one or more data storage units including, for example, a telematics data storage 1120 (that may be configured to store information including, for example, the telematics data 1122, the training set 1116, and the test set 1117) and an analytical model data storage 1118 that may be configured to store the analytical model 314. The computer 1102 may include the one or more processor(s) 1104, the one or more input device(s) 1106, the one or more output device(s) 1108, the one or more transceiver(s) 1110, and the memory 1112.

The processor(s) 1104 may operate to perform a variety of functions, as set forth herein. For example, the processor(s) 1104 may be configured to perform system processing steps using one or more computing engines such as, for example, the machine learning engine 1114 depicted in the memory 1112. For example, the processing steps may include obtaining fluidic pressure information indicative of fluidic pressure of a working fluid in a hydraulic cylinder of a machine as a function of time, and generating one or more training sets that include fluidic pressure information, where the fluidic pressure information is associated with observed machine torque response values. In other aspects, the processor(s) 1104 may compute a plurality of test system response values using the one or more training sets. The processor(s) 1104 may perform comparisons of the machine torque response values with observed machine torque response values, and generate system response errors associated with particular training sets used to generate the values. The system response errors may inform whether one or more changes to the training set(s) can improve an analytical model generated using the training sets. The processor(s) 1104 can also provide the time-step predictive analytical model 314 to the plurality of machines 1124, such that the analytical model 314 configures the machine(s) to control output torque and/or provide impeller clutch control. In some examples, the processor(s) 1104 may include a central processing unit (CPU), a graphics processing unit (GPU), both CPU and GPU, or other processing units or components known in the art. Additionally, at least some of the processor(s) 1104 may possess local memory, which also may store program modules, program data, and/or one or more operating systems.

The input device(s) 1106 may include a keypad, a cursor control, a touch-sensitive display, voice input device, etc. The output device(s) 1108 may include devices such as displays, speakers, printers, haptic feedback, etc. The input device(s) 1106 may include one or more of the input devices described with respect to the system 102. The input device(s) 1106 may further include other input devices such as, for example, keyboard, a mouse, touchscreen, microphone, etc.

The transceiver(s) 1110 can connect the computer 1102 with the plurality of machines 1124 through one or more network connection(s) 1126. The plurality of machines may be configured to provide the telematics data 1122 to the computer 1102, or another system accessible by the computer 1102. The transceiver(s) 1110 may include wired and/or wireless connections between components included on-board the machines 1124, and/or computing devices located off-board the machines 1124 such as, for example, the computer 1102. The transceiver(s) may connect the computer 1102 with a remote server (not shown), machine controller on-board any one or more of the plurality of machines 1124, a database, (e.g., a training set other than the training set 1116), etc. Information may be communicated to the one or more processor(s) 1104 via one or more network connection(s) 1126, which may include any type of network, such as a public wide-area-network (WAN) (e.g., the Internet), or another wireless network, which may utilize various different technologies including wired and wireless technologies.

The processor(s) 1104 may interact with, or include, computer-readable media, which may include volatile memory (e.g., RAM), non-volatile memory (e.g., ROM, flash memory, a miniature hard drive, a memory card, or the like), or some combination thereof. The computer-readable media may include the memory 1112, and can be non-transitory computer-readable media. The computer-readable media may be configured to store computer-executable instructions, which when executed by a computer, perform various operations associated with the processor(s) 1104 to perform the operations described herein.

The computer 1102 may employ one or more algorithms, such as a supervised learning algorithm (e.g., an artificial neural network, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The computer 1102 may further include a GRU neural network.

The memory 1112 may include the machine learning engine 1114 and information associated with building the analytical model 314, such a training set 1116. The memory 1112, telematics data storage 1120 and analytical model data storage 1118 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic tape, magnetic disk storage or other magnetic storage devices, or any other medium which can be used to store the desired information and which can be accessed by the computer 1102. Any such tangible computer-readable media, such as the analytical model data storage 1118 and the telematics data storage 1120 can be part of the computer 1102.

Telematics data can include operational data from one or more machines (e.g., the machines 1124) collected through GPS receivers, engine interfaces (e.g., electronic control modules, etc.), on-board SIM cards, accelerometers, sensor data, etc. Telematics data systems collect operational data associated with hardware operation and sensor data, such as position, speed, operational time, braking functions, driving functions, work tool functions, etc. The telematics data associated with the plurality of machines 1124 may further include, but are not limited to, a location of a work site at which a work session (or training dig operation) is performed, an utilization of a particular machine, and/or a specification and health of the corresponding machine, an impeller clutch type, an impeller type, a traction device type, etc. In an example, telematics data may include parameters related to operation of a particular machine, for example, speed, heading direction, location of the machine, or any other machine sensory information associated with one or more machine of the plurality of machines 1124. Machine sensor information may include time-step data indicative having force information that can include the force data indicative of fluidic pressure in a hydraulic lift cylinder as a function of time, lift cylinder velocity as a function of time, lift cylinder head-end pressure as a function of time, stall status of a lift cylinder as a function of time, etc. The telematics data may further include positional information indicative of a bucket angle with respect to time, a position or other property of a tilt command valve, an angle of a lift art with respect to time, etc. In other aspects, the telematics data may also include a unique identifier for the particular machines that have generated the telematics data, date and time information, worksite information such as work pile composition information, and/or other information.

The machine-generated telematics data may include characteristic data associated with one or more functionalities/characteristics of interest (e.g., fluid hydraulic pressures with respect to time) associated with a particular machine (and more practically, a plurality of machines). The characteristics may be, for example, force measurements taken at various locations of the machine such as fluidic pressure measurements or other information. As described herein, the telematics data can include data associated with a single characteristic of machine operation (e.g., velocity of the machine with respect to time during the work operation), or it may include data associated with various functions of the machine (e.g., changes in fluidic pressures with respect to time).

According to an embodiment telematics data may be isolated in part to show a time-step system response with respect to a specific characteristic of interest. For example, the training dig telematics data for a single machine of the plurality of machines 1124 may include a complete record of all fluid pressure readings during the dig as a function of time. The processor(s) 1104 may isolate the fluid pressure readings, and one or more other observations taken at the same time as the fluid pressure readings.

The training set 1116 may be stored in the memory 1112, and can include trained vector features extracted from the telematics data 1122, where clutch engagement values are associated with optimized weight values for a respective vector feature.

Embodiments may be illustrated and described as a logical flow graphs, the operation of which representing a sequence of operations. At least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

INDUSTRIAL APPLICABILITY

The exemplary systems and methods of the present disclosure may provide impeller clutch control, automatically, using a computer-implemented electronic control module in a machine that does not receive impeller clutch input from the operator. Using the disclosed system, machine, and methods for training the analytical models and training set can provide, a human machine operator may benefit from automated impeller clutch control that emulates clutch control of a human operator, in virtually unlimited working conditions, when the analytical model is adequately trained. Accordingly, efficiencies are immediately gained with respect to time, fuel consumption during a given work operation, and time to full productivity as a human operator begins to master machine operation.

Because the time-step predictive analytical model, and corresponding training set described herein, are trained using a machine learning method, a human machine operator may also benefit from many computer-driven models of impeller clutch control in varying materials and circumstances. The analytical model produced by machine learning methods such as those disclosed herein can provide adaptive and predictive impeller clutch control for a machine that can dynamically adjust to varying circumstances due to a wide array of possible work site conditions, materials, compactness of the work pile, etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An analytical model training method, comprising:
  obtaining, by a machine learning system, fluidic pressure information associated with at least one first machine, the fluidic pressure information being indicative of a fluidic pressure of a working fluid in a hydraulic cylinder of the at least one first machine during at least one training event as a function of time;

generating, by the machine learning system, a training set that associates a portion of the fluidic pressure information with a plurality of observed impeller clutch engagement values observed during the at least one training event;

training, by the machine learning system, and using supervised machine learning techniques, a time-step predictive analytical model by:
  predicting, via the time-step predictive analytical model, and using the portion of the fluidic pressure information in the training set, a first plurality of predicted impeller clutch engagement values;
  comparing the plurality of predicted impeller clutch engagement values with the plurality of observed impeller clutch engagement values, and determining, based at least in part on the comparing, a system response error value associated with the training set; and
  determining that the system response error value is less than or equal to a threshold error value; and providing, by the machine learning system, the time-step predictive analytical model to an impeller clutch controller of a second machine, wherein the time-step predictive analytical model configures the impeller clutch controller to modulate engagement of an impeller clutch of the second machine.

2. The method of claim 1, wherein the impeller clutch controller is configured to:
  receive second fluidic pressure information from an input device, the second fluidic pressure information comprising a time-step series of fluidic pressure values indicative of a real-time fluidic pressure of an instance of the working fluid in an instance of the hydraulic cylinder of the second machine as a function of time;
  predict, using the time-step predictive analytical model, a real-time control output based at least in part on the second fluidic pressure information, the real-time control output associated with engagement of the impeller clutch; and
  modulate engagement of the impeller clutch according to the real-time control output.

3. The method of claim 1, wherein the impeller clutch controller is configured to control engagement of the impeller clutch without receiving a manual torque control signal.

4. The method of claim 1, wherein obtaining the fluidic pressure information comprises:
  receiving, by the machine learning system, telematics data generated by at least one data channel of a plurality of data channels on the at least one first machine, wherein the at least one data channel generates the telematics data, and the fluidic pressure information, during the at least one training event, wherein the machine learning system is off-board the at least one first machine;
  segmenting, by the machine learning system, the telematics data into a training data portion and a test data portion; and
  isolating, by the machine learning system, and in one or more of the training data portion or the test data portion, a first channel data set associated with the at least one data channel of the plurality of data channels.

5. The method of claim 4, wherein training the time-step predictive analytical model comprises:
  iteratively adjusting the portion of the fluidic pressure information in the training set based on different sets of one or more data channels, of the plurality of data channels, until the system response error value, determined by comparing the plurality of predicted impeller clutch engagement values predicted using the portion of the fluidic pressure information with the plurality of observed impeller clutch engagement values is less than or equal to the threshold error value.

6. The method of claim 1, wherein the training set comprises:
  a first channel data set associated with a first channel of a plurality of data channels, the first channel data set including the portion of the fluidic pressure information associated with the plurality of observed impeller clutch engagement values; and
  a second channel data set associated with a second channel of the plurality of data channels.

7. The method of claim 6, wherein, the second channel data set comprises a set of values indicative of one or more of i) a velocity of the hydraulic cylinder, ii) a head-end pressure of the hydraulic cylinder, iii) a stalled status of the hydraulic cylinder, iv) a lift linkage angle, v) a work tool angle, or vi) a tilt command valve position.

8. A method comprising:
  obtaining fluidic pressure information associated with at least one first machine, the fluidic pressure information being indicative of a fluidic pressure of a working fluid in a hydraulic cylinder of the at least one first machine during at least one training event as a function of time;
  generating a training set that associates a portion of the fluidic pressure information with first impeller clutch engagement values observed on the at least one first machine during the at least one training event;
  training a time-step predictive analytical model, via supervised machine learning techniques based on the training set, to use the portion of the fluidic pressure information to predict the first impeller clutch engagement values; and
  providing the time-step predictive analytical model to an impeller clutch controller of a second machine, wherein the impeller clutch controller is configured to control engagement of an impeller clutch of the second machine using the time-step predictive analytical model.

9. The method of claim 8, wherein the impeller clutch controller is configured to control the engagement of the impeller clutch by:
  receiving, from an input device associated with the second machine, a time-step series of fluidic pressure values indicative of a real-time fluidic pressure of an instance of the working fluid in an instance of the hydraulic cylinder of the second machine as a function of time;
  predicting, using the time-step predictive analytical model, a second impeller clutch engagement value based at least in part on the time-step series of fluidic pressure values; and
  causing the engagement of the impeller clutch according to the second impeller clutch engagement value.

10. The method of claim 9, wherein the input device is a pressure measurement device configured to generate the time-step series of fluidic pressure values, and wherein the time-step series of fluidic pressure values is indicative of at least one fluidic pressure value.

11. The method of claim 9, wherein the time-step series of fluidic pressure values is indicative of one or more of i) a velocity of the instance of the hydraulic cylinder, ii) a head-end pressure of the instance of the hydraulic cylinder, iii) a stalled status of the instance of the hydraulic cylinder, iv) a lift linkage angle, v) a work tool angle, or vi) a tilt command valve position.

12. The method of claim 8, wherein:
the fluidic pressure information is associated with a plurality of data channels, and
training the time-step predictive analytical model comprises:
generating predicted impeller clutch engagement values with the time-step predictive analytical model based on the portion of the fluidic pressure information in the training set; and
iteratively adjusting the portion of the fluidic pressure information in the training set, based on different sets of one or more data channels of the plurality of data channels, until a system response error value between the predicted impeller clutch engagement values and the first impeller clutch engagement values is less than or equal to a threshold error value.

13. The method of claim 9, wherein the impeller clutch controller is configured to cause the engagement without receiving a manual impeller clutch engagement signal.

14. A method, comprising:
obtaining fluidic pressure information associated with at least one first machine, the fluidic pressure information being indicative of a fluidic pressure of a working fluid in a hydraulic cylinder of the at least one first machine during at least one training event as a function of time;
generating a training set that associates a portion of the fluidic pressure information with a plurality of first machine torque response values observed during the at least one training event;
training, using supervised machine learning techniques, a time-step predictive analytical model by:
predicting, via the time-step predictive analytical model, and using the portion of the fluidic pressure information in the training set, a plurality of second machine torque response values;
determining a system response error value associated with the training set based at least in part on the plurality of second machine torque response values and the plurality of first machine torque response values; and
determining that the system response error value is less than or equal to a threshold error value; and
providing the time-step predictive analytical model to a controller of a second machine, wherein the time-step predictive analytical model configures the controller to modulate output torque of a transmission of the second machine.

15. The method of claim 14, wherein the controller is configured to:
receive second fluidic pressure information from an input device, the second fluidic pressure information comprising a time-step series of fluidic pressure values indicative of a real-time fluidic pressure of an instance of the working fluid in an instance of the hydraulic cylinder of the second machine as a function of time;
predict, using the time-step predictive analytical model, a real-time control output based at least in part on the second fluidic pressure information, the real-time control output associated with the output torque; and
modulate the output torque of the second machine, according to the real-time control output.

16. The method of claim 15, wherein the controller is configured to modulate the output torque without receiving a manual torque control signal.

17. The method of claim 14, wherein obtaining the fluidic pressure information comprises:
receiving telematics data generated by at least one data channel of a plurality of data channels on the at least one first machine, wherein the at least one data channel generates the telematics data, and the fluidic pressure information during the at least one training event;
segmenting the telematics data into a training data portion and a test data portion; and
isolating, in one or more of the training data portion or the test data portion, a first channel data set associated with the at least one data channel of the plurality of data channels.

18. The method of claim 17, wherein training the time-step predictive analytical model comprises:
iteratively adjusting the portion of the fluidic pressure information in the training set based on different sets of one or more data channels, of the plurality of data channels, until the system response error value, determined by comparing the plurality of second machine torque response values predicted using the portion of the fluidic pressure information with the plurality of first machine torque response values, is less than or equal to the threshold error value.

19. The method of claim 14, wherein the training set comprises:
a first channel data set associated with a first channel of a plurality of data channels, the first channel data set including the portion of the fluidic pressure information associated with the plurality of first machine torque response values; and
a second channel data set associated with a second channel of the plurality of data channels.

20. The method of claim 19, wherein the second channel data set comprises a set of values indicative of one or more of i) a velocity of the hydraulic cylinder, ii) a head-end pressure of the hydraulic cylinder, iii) a stalled status of the hydraulic cylinder, iv) a lift linkage angle, v) a work tool angle, or vi) a tilt command valve position.

* * * * *